US008421925B2

(12) United States Patent
Su et al.

(10) Patent No.: US 8,421,925 B2
(45) Date of Patent: Apr. 16, 2013

(54) DISPLAY DEVICE AND COLOR ADJUSTMENT METHOD FOR ADJUSTING HUE, SATURATION, OR INTENSITY FACTORS OF SUB-IMAGE WITHIN AN IMAGE

(75) Inventors: Wei-Chen Su, Tainan County (TW); Chung-Wen Hung, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 1224 days.

(21) Appl. No.: 11/766,062

(22) Filed: Jun. 20, 2007

(65) Prior Publication Data

US 2008/0252794 A1 Oct. 16, 2008

(30) Foreign Application Priority Data

Apr. 10, 2007 (TW) ............................... 96112421 A

(51) Int. Cl.
*H04N 9/64* (2006.01)

(52) U.S. Cl.
USPC .......................................... 348/649; 348/651

(58) Field of Classification Search .................. 348/580, 348/581, 583, 645–654, 703, 687; 358/518, 358/1.9; 382/167, 274; 345/589, 591, 660; *H04N 9/74, 9/68, 9/64, 5/57*
See application file for complete search history.

(56) References Cited

U.S. PATENT DOCUMENTS

| | | | | |
|---|---|---|---|---|
| 6,711,287 | B1 * | 3/2004 | Iwasaki | 382/165 |
| 2005/0212825 | A1 * | 9/2005 | Lee et al. | 345/690 |
| 2006/0061842 | A1 | 3/2006 | Oka et al. | |
| 2006/0164556 | A1 * | 7/2006 | Samadani et al. | 348/649 |
| 2007/0030501 | A1 * | 2/2007 | Sanami | 358/1.9 |
| 2007/0070468 | A1 * | 3/2007 | Ogawa | 358/518 |

FOREIGN PATENT DOCUMENTS

| | | |
|---|---|---|
| JP | 2005151212 | 6/2005 |
| TW | 200614825 | 5/2006 |

* cited by examiner

*Primary Examiner* — Sherrie Hsia
(74) *Attorney, Agent, or Firm* — Jianq Chyun IP Office

(57) ABSTRACT

A display device and a color adjustment method thereof and a method for displaying video signals are provided. The display device includes a video signal receiver, a scaling engine, a color engine, an output stage, and a panel. The video signal receiver receives the video signals. The scaling engine is coupled to the video signal receiver to modulate the resolution of the video signal. The color engine is coupled to the scaling engine, which includes a local adjusting unit. The local adjusting unit adjusts hue, saturation, or intensity of a group of pixels, and thereby increase the quality of images. The output stage is coupled to the color engine, which outputs the adjusted video signals. The panel is coupled to the output stage, which displays the adjusted video signal.

33 Claims, 19 Drawing Sheets

201
P1
P2
P3
P4
P5
P6
P7
P8
P9
Red
Yellow
Green
Cyan
Blue
Purple
A3
A4
A5
A6
A7
A8
F101
F112

201
P1
P2
P3
P4
P5
P6
P7
P8
P9
Green
Yellow
Cyan
Red
Blue
Purple
A7
A8
A9
A10
F101
F113

DISPLAY DEVICE AND COLOR ADJUSTMENT METHOD FOR ADJUSTING HUE, SATURATION, OR INTENSITY FACTORS OF SUB-IMAGE WITHIN AN IMAGE

CROSS-REFERENCE TO RELATED APPLICATION

This application claims the priority benefit of Taiwan application serial no. 96112421, filed Apr. 10, 2007. All disclosure of the Taiwan application is incorporated herein by reference.

BACKGROUND OF THE INVENTION

1. Field of the Invention

The present invention generally relates to a color adjustment method, and more particularly, to a color adjustment method for a display device.

2. Description of Related Art

As science and technology advances, higher displaying quality of video products is demanded. Typically, color adjustment methods of current display devices can be generally divided into intensity adjustment, hue adjustment, and saturation adjustment. It is well known that a relative high color relationship exhibits in a color space of red (R), green (G), and blue (B) color. Therefore, such RGB color space is often converted into an HSI color space, in which H represents hue; S represents saturation; and I represents intensity. For example, an RGB color space can be converted into an HSI color space in accordance with the following equations (1) through (3):

$H=\theta$, if $B \leqq G$, and $H=360-\theta$, if $B>G$, wherein $\theta=$ $$\cos^{-1}\left\{\frac{\frac{1}{2}[(R-G)+(R-B)]}{[(R-G)^2+(R-B)(G-B)^{1/2}]}\right\} \tag{1}$$

$$S=1-\frac{3}{(R+G+B)}[\min(R, G, B)] \tag{2}$$

$$I=\frac{1}{3}(R+G+B) \tag{3}$$

As such, the H, S, I factors can be easily adjusted in the HSI color space. Thereafter, H factor of each pixel thereof can be adjusted, for example, the H factor of each pixel is added up with 30. Similarly, I factor of each pixel thereof can also be adjusted, for example, the I factor of each pixel is added up with 30. In this situation, H, S or I factors of all pixels are adjusted in the meantime. However, it is not always necessary for all pixels of the image to be adjusted. Apparently, the aforementioned method unavoidably adjusts those did not need adjustment, and causes chrominance and luminance deviation thereto.

Accordingly, an solution thereof is proposed to adjust H, S, and I factors of sub-images of the image. However, this solution causes discontinuity between borders of the sub-images.

SUMMARY OF THE INVENTION

The present invention is directed to a display device, which is adapted for adjusting color hue, color saturation, or luminance factors of pixel groups having a color hue in a predetermined range, and thus improving image displaying quality thereof.

The present invention provides a display device. The display device counts number of pixels of different color hues, according to which the color hue, saturation, or luminance of parts of or whole of the image are adjusted, so as to improve the suitability of the image.

The present invention is also directed to provide a method for displaying video signals. The method is adapted for adjusting color hue, saturation or luminance factors of pixel groups having a color hue in a predetermined range, so as to obtain more vivid images.

The present invention is further directed to a method for displaying video signals. The method is adapted for adjusting color hues of pixels displaying different colors according to number of the pixels, so as to improve image displaying quality thereof.

The present invention is also directed to a color adjustment method of a display device. The color adjustment method is adapted for adjusting color hue, color saturation or luminance factors, in accordance with color hues and color saturations of different pixel groups, so as to improve sharpness of displayed images.

The present invention provides a display device including a video signal receiver, a scaling engine, a color engine, an output stage, and a panel. The video signal receiver is adopted for receiving video signals. The scaling engine is coupled to the video signal receiver and is adopted for modulating a resolution of the video signal. The color engine is coupled to the scaling engine and is adopted for receiving the video signals. The color engine includes a local adjusting unit, which is adopted for adjusting color hue, color saturation, or luminance factors of a first pixel group having a color hue in a predetermined range. The output stage is coupled to the color engine, and is adopted for outputting the adjusted video signals. The panel is coupled to the output stage, and is adopted for displaying the adjusted video signals.

According to an embodiment of the present invention, the foregoing local adjusting unit is adapted for adjusting color hue, color saturation, or luminance factors of a second pixel group having a color hue in a predetermined range, and a color saturation in a predetermined range.

The present invention further provides a display device. The display device includes a color engine, an output stage and a panel. The color engine is adapted for receiving video signals. The color engine includes a hue counting unit, for counting number of pixels of each pixel group of the image of the video signals, each pixel group having a color hue specifically in a predetermined range. The color engine adjusts the video signals according to the quantity of pixels of each pixel group. The output stage is coupled to the color engine, and is adopted for outputting adjusted video signals. The panel is coupled to the output stage, and is adopted for displaying the adjusted video signals.

According to an embodiment of the present invention, the color engine further includes a local adjusting unit, which is adapted for adjusting color hue, color saturation, or luminance factors of a first pixel group having a color hue in a predetermined range.

The present invention also provides a method for displaying video signals, which may be described as follows. First, video signals, for example, digital signals are received. Next, a resolution of the video signals is modulated. Next, the color hue, color saturation, or luminance factors of a first pixel group of an image of the video signals is adjusted, wherein the first pixel group has a color hue in a predetermined range. Finally, the adjusted video signals are displayed.

According to an embodiment of the present invention, the foregoing method for displaying video signals further includes adjusting color hue, color saturation or luminance factors of a second pixel group having a color hue in a specific predetermined range, and a color saturation in a specific predetermined range.

The present invention further provides a method for displaying video signals, which may be described as follows. First, video signals, for example, digital signals are received. Next, the number of pixels in each pixel group of an image of the video signals is counted, wherein each pixel groups has a color hue in a specific predetermined range. Next, the video signals are adjusted according to the pixel quantity of each pixel group. Finally, the adjusted video signals are displayed.

According to an embodiment of the present invention, the foregoing method for displaying video signals further includes adjusting color hue, color saturation, or luminance factors of the first pixel group which color hue is in the predetermined range.

The present invention further provide a color adjustment method for a display device, which may be described as follows. First, a plurality of pixels is distributed into a plurality of color hue areas according to color hue and color saturation factors thereof and then the distributed positions of the pixels in different color hue areas are adjusted by a conversion function.

According to an embodiment of the present invention, the foregoing color adjustment method further includes counting the number of pixels in each color hue area; and generating the conversion function according to the accounted quantity of the pixels in each color hue area.

The present invention respectively adjusts color hue, color saturation or luminance factors of pixel groups, each has a color hue in a specific predetermined range, so as to improve image displaying quality thereof.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2-1 is a schematic diagram illustrating color hue, color saturation factors of pixels of an image frame according to the first embodiment of the present invention.

FIG. 2-2 is a schematic diagram illustrating the adjustment of a color hue of a pixel in area A1 according to the first embodiment of the present invention.

FIG. 2-3 is a schematic diagram illustrating the adjustment of a color saturation of a pixel in area A1 according to the first embodiment of the present invention.

FIG. 2-4 is a schematic diagram illustrating the adjustment of a color saturation of a pixel in area A1 according to the first embodiment of the present invention.

FIG. 2-5 is a schematic diagram illustrating the adjustment of a color saturation of a pixel in area A2 according to the second embodiment of the present invention.

FIG. 2-6 is a schematic diagram illustrating the adjustment of a color saturation of a pixel in area A2 according to the second embodiment of the present invention.

FIG. 2-7 is a schematic diagram illustrating the adjustment of a color saturation of a pixel in area A2 according to the second embodiment of the present invention.

FIG. 3 is a structural diagram illustrating a display device according to the third embodiment of the present invention.

FIG. 4 is a structural diagram of illustrating a color engine according to the fourth embodiment of the present invention.

FIG. 5-1 is a schematic color hue diagram according to the fourth embodiment of the present invention.

FIG. 5-2 is a schematic diagram illustrating a global hue adjustment according to the fourth embodiment of the present invention.

FIG. 5-3 is a schematic diagram illustrating a global saturation adjustment according to the fourth embodiment of the present invention.

FIG. 5-4 is a schematic diagram illustrating a global intensity luminance adjustment according to the fourth embodiment of the present invention.

FIG. 5-5 is a schematic diagram illustrating a luminance accounting according to the fourth embodiment of the present invention.

FIG. 6 is a luminance gamma curve according to the fourth embodiment of the present invention.

FIG. 7 is a structural diagram illustrating a display device according to the fifth embodiment of the present invention.

FIG. 10-1 is a flow chart illustrating a color adjustment method for the display device according to the eighth embodiment of the present invention.

FIG. 10-2 is a schematic diagram illustrating a color adjustment shown in FIG. 10-1.

FIG. 10-3 is a schematic diagram illustrating another color adjustment shown in FIG. 10-1.

DESCRIPTION OF THE EMBODIMENTS

Figure 1:
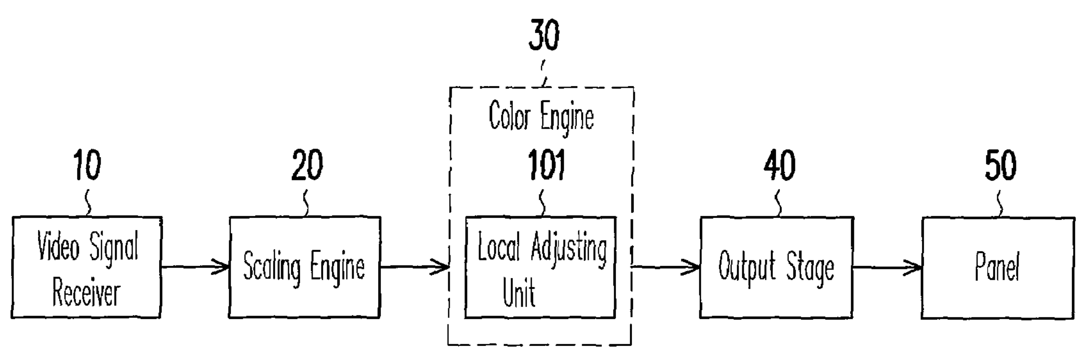
FIG. 1 is a structural diagram illustrating a display device according to the first embodiment of the present invention.

FIG. 1 is a structural diagram illustrating a display device according to a first embodiment of the present invention. Referring to FIG. 1, the display device includes a video signal receiver 10, a scaling engine 20, a color engine 30, an output stage 40, and a panel 50. The video signal receiver 10 is adapted for receiving video signals. According to an aspect of the first embodiment, the video signal receiver 10 comprises, for example, an analog digital converter (ADC), which can convert analog video signals into digital video signals. However, according to other aspects of the first embodiment or other embodiments, other video signal receiver, such as a digital visual interface (DVI) can also be employed for outputting digital signals. The scaling engine 20 is coupled to the video signal receiver 10 for receiving the digital video signals and modulating a resolution of the video signals, for example, converting video signals having a resolution of 1280×1240 into video signals having a resolution of 1024×768. One having ordinary skill in the art may convert specific resolution of the video signals according to the actual needs, which is well known and not to be iterated hereby.

The color engine 30 is coupled to the scaling engine 20 and receives the video signals. However, it is to be noted that the color engine 20 includes a local adjusting unit 101. The local adjusting unit 101 is employed to adjust color hue, color saturation, or luminance factors of a first pixel group having a color hue in a predetermined range of an image frame of the video signals. The output stage 40 is coupled to the color engine 30 for improving a driving ability of the video signals and outputting video signals. The panel 50 is coupled to the output stage 40 for displaying adjusted video signals. Hereinafter, various schemes of the color engine 30 to adjust the video signals are described in detail.

Figure 2:
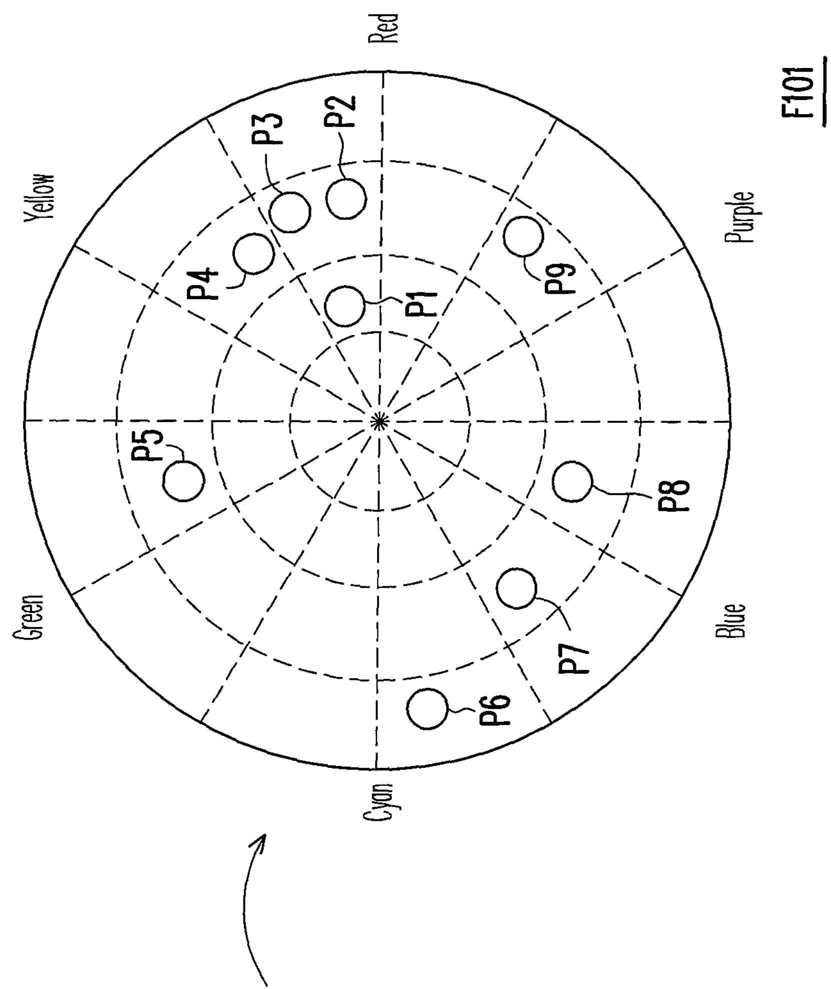
Figure 1:
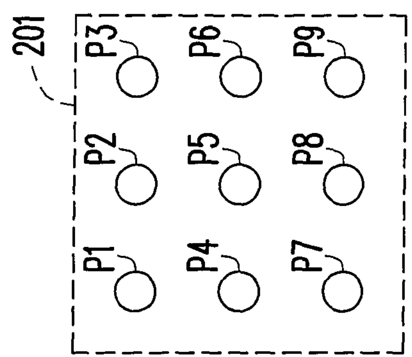
Figure 2:
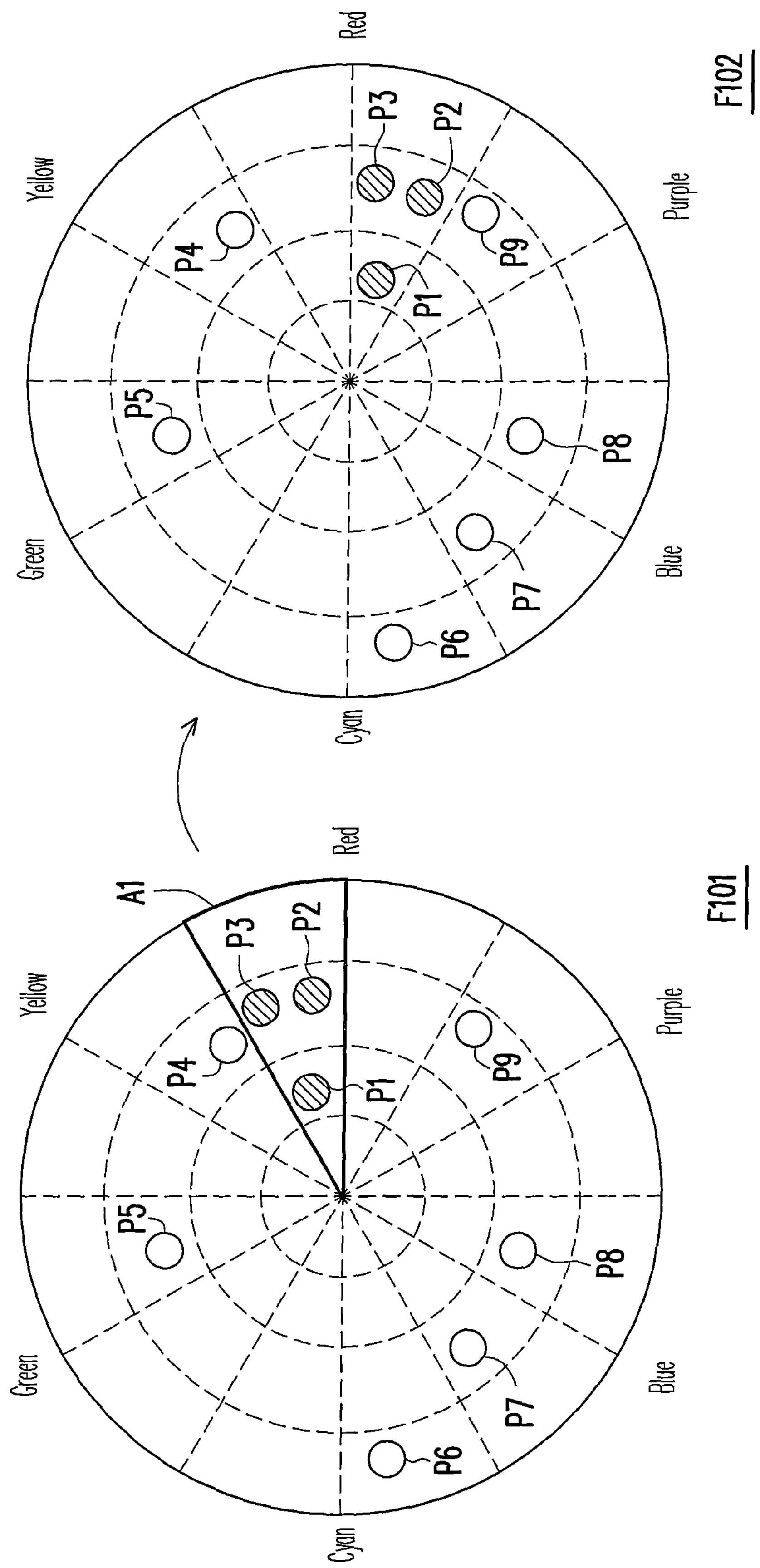

FIG. 2-1 is a schematic diagram illustrating color hue, color saturation factors of pixels of an image frame according to the first embodiment of the present invention. Referring to FIG. 2-1, image frame 201 is illustrated as an example of an image frame of the video signals. In this embodiment, the image frame 201 is illustrated to comprise, for example, a 3×3 resolution. Those having ordinary skill in the art would understand that the 3×3 resolution is for illustration purpose only and is not intended to limit the scope of the present invention, while in other embodiments, other resolutions are also possible.

The image frame 201 includes pixels P1 through P9, each of which has its own color hue, color saturation, and luminance factors, which may be different from others. For illustration purpose, the luminance factors of the pixels P1 through P9 are named as luminance 1 through luminance 9, respectively, and the color hue and color saturation factors of the pixels P1 through P9 are described as shown in the color distribution diagram F101. In the color distribution diagram F101, the color hue factors of the pixels are represented by angles. For example, red color, green color and blue color are respectively represented by 0°, 120°, and 240°, while a color distribution between 0° and 120° can be obtained by mixing red color and green color, a color distribution between 120° and 240° can be obtained by mixing green color and blue color, and a color distribution between 240° and 360° can be obtained by mixing blue color and red color, wherein both of 360° and 0° represent red color. In the color distribution diagram F101, the color saturation factors of the pixels are described with the distances away from the central point of the round diagram, in which a pixel positioned at the central point has a color saturation of 0, and those are farthest away from the central point have the greatest color saturation factors.

The local adjusting unit 101 is adapted for adjusting color hue, color saturation, or luminance factors of a first pixel group having a color hue in a specific predetermined range. If the first pixel is positioned in an area A1, the local adjusting unit 101 of the color engine 30 adjusts the color hue, color saturation, or luminance factors of pixels having a color hue between 0° to 30° (P1 through P3) of the image frame 201.

FIG. 2-2 is a schematic diagram illustrating the adjustment of a color hue of a pixel in the area A1 according to the first embodiment of the present invention. Referring to FIG. 2-2, an example of the local adjusting unit 101 adjusting color hue factors of pixels in an A1 area is shown. The local adjusting unit 101 reduces 30° of color hue factors of pixels P1 through P3, then the color hue and color saturation factors of the pixels P1 through P3 changes from the color distribution diagram F101 to another color distribution diagram F102, in which the color saturation and luminance remain unchanged of which the color hue thereof is shifted from red to purple. In the meantime, color hue, color saturation, and luminance factors of pixels P4 through P9 are maintained unchanged. This embodiment has an advantage that the local adjusting unit 101 can adjust the color hue of the first pixel group which remaining color hue, color saturation and luminance factors of the other pixels unchanged. Furthermore, it should be noted that when the large angles are adjusted in accordance with the embodiment as illustrated in FIG. 2-2, the image frame may have an inconsecutive color presence. Therefore, adjustment with smaller angles is preferred for adjusting the color hue of the pixel group in the predetermined range.

Figures 2, 3:
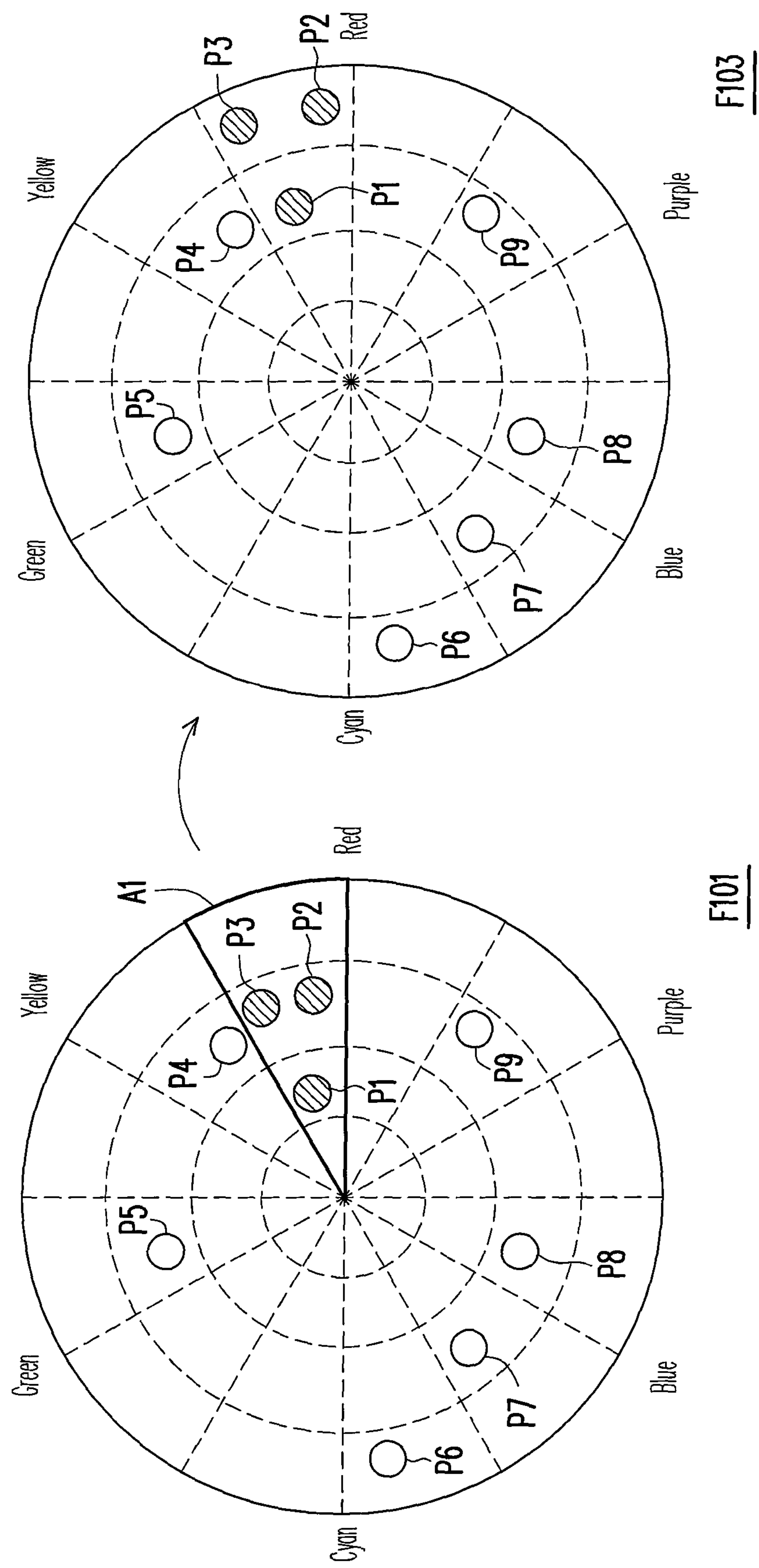

FIG. 2-3 is a schematic diagram illustrating the adjustment of a color saturation of a pixel in area A1 of the first embodiment according to the present invention. FIG. 2-3 illustrates the local adjusting unit 101 adjusting the color saturation factors of pixels positioned in the area A1 as an example. The local adjusting unit 101 increases the color saturation of the pixels P1 through P3, then the color hue and color saturation factors change from the color distribution diagram F101 to the color distribution diagram F103. Meanwhile, the color hue and luminance of the pixels P1 through P3 remain unchanged. Further, the color hue, color saturation, and luminance factors of the pixels P4 through P9 remain unchanged. In such a way, the local adjusting unit 101 can adjust the color saturation of the first pixel group while remaining the color hue, color saturation and luminance factors of the other pixels unchanged.

Figures 2, 3, 4:
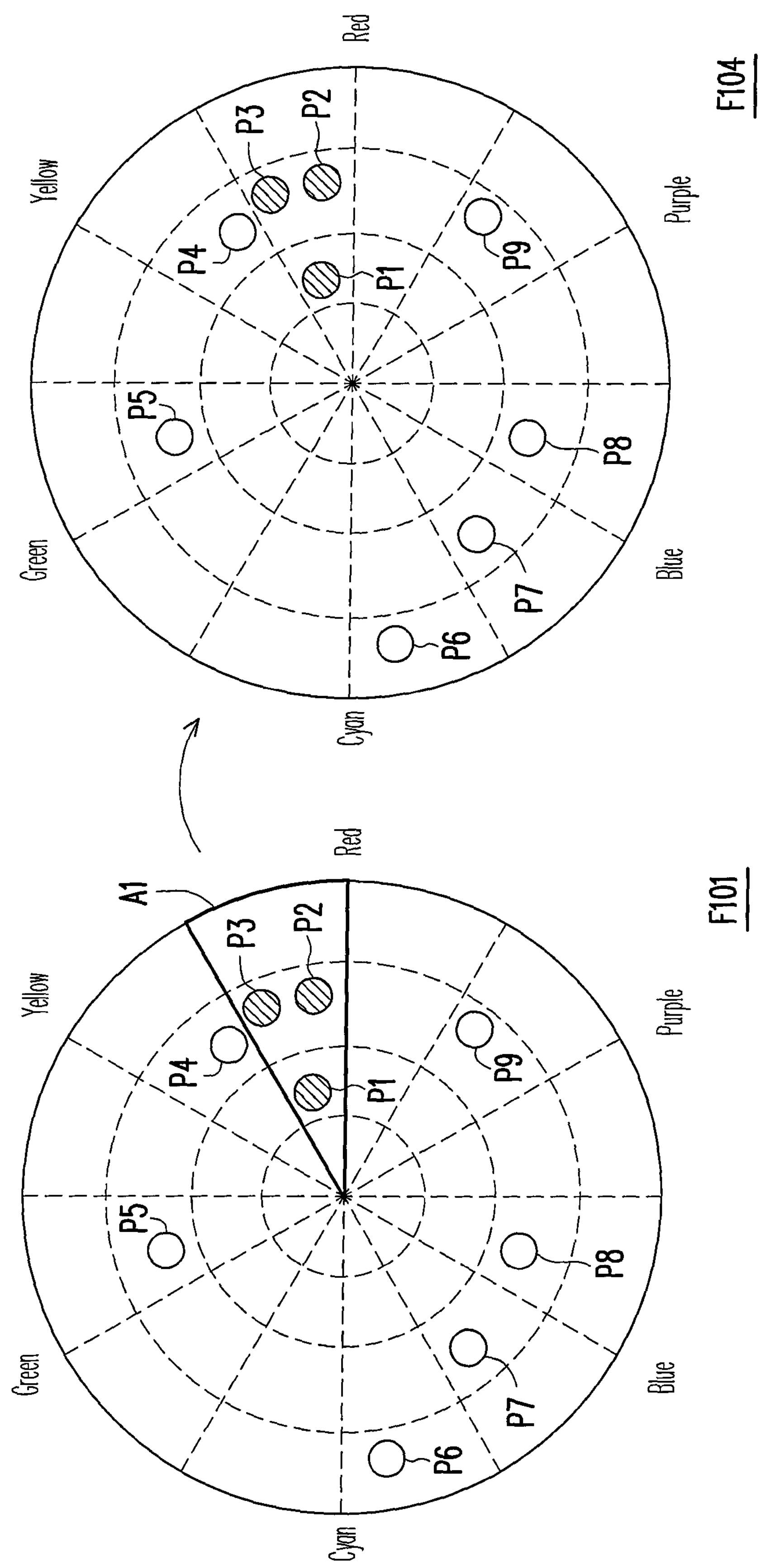

FIGS. 2-4 is a schematic diagram illustrating the adjustment of color luminance of a pixel in area A1 according to the first embodiment of the present invention. FIGS. 2-4 illustrates the local adjusting unit 101 adjusting the luminance factors of pixels positioned in the area A1 as an example. The local adjusting unit 101 adds 5 to the luminance of pixels P1 through P3, and therefore the luminance of respectively P1 through P3 increases from 1, 2, 3 to 6, 7, 8, respectively. The color hue, color saturation factors of the pixels P1 through P3 remain unchanged, that is illustrated as changing from the color distribution diagram F101 to the color distribution diagram F104, while the two diagrams are identical except the luminance changes. Further, the color hue, color saturation, and luminance factors of the pixels P4 through P9 remain unchanged. In such a way, the local adjusting unit 101 can adjust the luminance of the first pixel group while remaining the color hue, color saturation and luminance factors of the other pixels unchanged.

Those having ordinary skill in the art would be able to modify the foregoing embodiments according to the spirit of the present invention illustrated above according to the practical needs. For example, the local adjusting unit 101 of the color engine 30 can also adjust color hue, color saturation, or luminance factors of a second pixel group, which has a predetermined range of color hue and a predetermined range of color saturation. If the second pixel group is positioned in an area A2, the local adjusting unit 101 of the color engine 30 adjusts the color hue, color saturation, or luminance factors of pixels, namely hereby pixels P2 and P3, in the area A2 of the image frame 201.

FIGS. 2-5 is a schematic diagram illustrating the adjustment of color hue of a pixel in area A2 according to a second embodiment of the present invention. FIGS. 2-5 illustrates the local adjusting unit 101 adjusting the color hue factors of pixels positioned in the area A2 as an example. The local adjusting unit 101 reduces 90° of color hue factors of pixels P2 and P3, then the color hue and color saturation factors of the pixels P2 and P3 change from the color distribution diagram F101 to another color distribution diagram F105. The color saturation and the luminance of the pixels P2 and P3 remain unchanged, while the color hue is shifted from red to purple. The color hue, color saturation, and luminance factors of the pixels P4 through P9 remain unchanged. In such a way, the local adjusting unit 101 can adjust the color hue of the second pixel group while remaining the color hue, color saturation and luminance factors of the other pixels unchanged.

FIGS. 2-6 is a schematic diagram illustrating the adjustment of color saturation of a pixel in area A2 according to the second embodiment of the present invention. FIG. 2-6 illustrates the local adjusting unit 101 adjusting the color saturation factors of pixels positioned in the area A2 as an example. The local adjusting unit 101 increases the color saturation of pixels P2 and P3, then the color hue and color saturation factors of the pixels P2 and P3 change from the color distribution diagram F101 to another color distribution diagram F106, while the color hue and luminance factors remain unchanged. The only change is that the color saturation is increased. The color hue, color saturation, and luminance factors of the pixels P4 through P9 remain unchanged. In such a way, the local adjusting unit 101 can adjust the color saturation of the second pixel group while the remaining the color hue, color saturation and luminance factors of the other pixels unchanged.

FIGS. 2-7 is a schematic diagram illustrating the adjustment of color luminance of a pixel in area A2 according to the second embodiment of the present invention. FIGS. 2-7 illustrates the local adjusting unit 101 adjusting the luminance factors of pixels positioned in the area A2 as an example. The local adjusting unit 101 adds 5 to the luminance of pixels P2 and P3, then the luminance of the respective pixels P2 and P3 increase from 2 and 3 to 7 and 8. The color hue and color saturation factors of the pixels P2 and P3 change from the color distribution diagram F101 to another color distribution diagram F107, while the color hue and luminance factors remain unchanged. The only change is the luminance. The color hue, color saturation, and luminance factors of the pixels P4 through P9 remain unchanged. In such a way, the local adjusting unit 101 can adjust the luminance of the second pixel group while remaining the color hue, color saturation and luminance factors of the other pixels unchanged.

Furthermore, those having ordinary skill in the art may also modify the structure of the display device as illustrated in the foregoing embodiment according to the spirit of the present invention. For example, FIG. 3 is a structural diagram illustrating a display device according to the third embodiment of the present invention. Referring to FIG. 3, in the third embodiment, the display device includes a video signal receiver 10, a scaling engine 20, a color engine 30, an output stage 40, a panel 50, a flash memory 60, and a micro controller (MCU) 70. The video signal receiver 10, the scaling engine 20, the color engine 30, the output stage 40, and the panel 50 are identical as disclosed in the foregoing embodiments, and the description thereof will not be repeated. The difference therebetween is the flash memory 60, and the MCU 70. The MCU 70 performs the calculation processes and controls the display device. The flash memory 60 is coupled to the color engine 30, and is adapted for pre-store a color adjustment program code. The color engine 30 is capable of adjusting color hue, color saturation, or luminance factors of the received display signals according to the color adjustment program code stored in the flash memory.

Those having ordinary skill in the art may also employ a hue histogram unit, a pre-defined color management table unit, a global hue unit, a global saturation unit, a global intensity unit, a luminance counting unit, or a luminance gamma curve unit in the color engine 30, and modify the coupling relationship therebetween accordingly. FIG. 4 is a structural diagram of illustrating a color engine according to the fourth embodiment of the present invention. Referring to FIG. 4, the color engine 30 includes a local adjusting unit 101, a hue counting unit 401, a pre-defined color management table unit 402, a global hue unit 402, a global saturation unit 404, a global intensity unit 405, a luminance counting unit 406, and a luminance gamma curve unit 407. The local adjusting unit 101 is identical to the foregoing embodiments, and the description thereof will not be repeated.

Figures 2, 3, 4, 5:
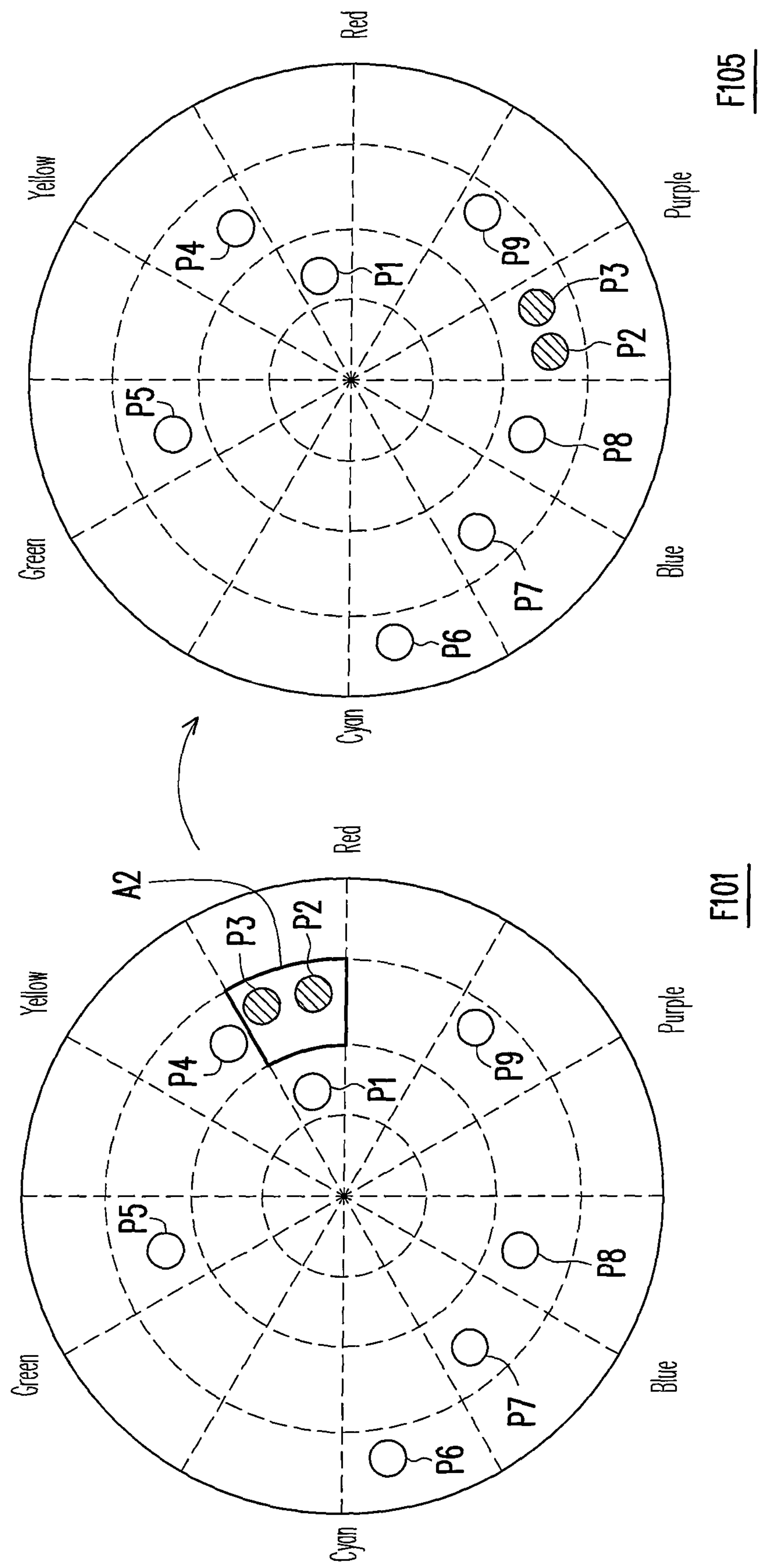

The color histogram unit 401 is adapted for counting the number of pixels in each pixel group of the image frame, in which each pixel group has a color hue in a specific predetermined range. FIG. 5-1 is a schematic hue counting diagram of the fourth embodiment of the present invention. Referring to FIG. 5-1, in this embodiment, the present invention is illustrated as dividing color hue areas by 30°, while in other embodiments other angles may also be used for dividing the color hue areas. After counting the color hues, the color distribution diagram F101 is changed to a color distribution diagram F108, in which the quantity of pixels having a color hue in the range between 0° and 30° is 3, which is marked at the outside peripheral of the part corresponding to 0° and 30°. Likewise, number corresponding to the ranges of 30° through 60°, 60° through 90°, 90° through 120°, 120° through 150°, 150° through 180°, 180° through 210°, 210° through 240°, 240° through 270° 270° through 300°, 300° through 330°, and 330° through 360° are respectively 1, 0, 1, 0, 0, 1, 1, 1, 0, 1, and 0. In such a way, the color hue distribution of each pixel of image frame can be obtained by employing the hue counting unit 401. In other words, it can be learnt what kind of the image frame is by employing the hue counting unit 401. For example, when most of the pixels are counted as blue, the image frame may be an image of sky; or when most of the pixels are counted as of a skin color, the image frame may be an image of a human.

The pre-defined color management table unit 402 defines a color management table according to the number of pixels of the pixel groups counted by the hue counting unit 401. The color engine 30 adjusts the video signals according to the color management table. For example, when it is learnt that the image frame is an 1*o* image of sky, the pre-defined color management table unit 402 generates a color management table to intensify blue color to the pixels, so that the image of sky looks bluer, and when it is learnt that the image frame is an image of a human, the pre-defined color management table unit 402 generates a color management table to intensify skin color to the pixels, so that the image of sky looks fairer.

The global hue unit 403 is adapted for adjusting color hue factors of pixels of the whole image frame. FIG. 5-2 is a schematic diagram illustrating a global hue adjustment according to the fourth embodiment of the present invention. Referring to FIG. 5-2, the fourth embodiment is illustrated using the global hue unit 403 adding 30° to the color hue of each pixel, while in other embodiments other angles may be added or decreased as needed. After being adjusted by the global hue unit 403, pixels of the color distribution diagram F101 shift to another color distribution diagram F109. In such a way, the color hue factors of the pixels of the whole image frame can be adjusted in general, while remaining the color saturation and luminance unchanged, so as to drastically reduce the complexity of calculation.

The global saturation unit 404 is adapted for adjusting color saturation factors of the pixels of the whole image frame in general. FIG. 5-3 is a schematic diagram illustrating a global saturation adjustment of the fourth embodiment according to the present invention. Referring to FIG. 5-3, the fourth embodiment is illustrated in which the global saturation unit 404 increases the color saturation of each pixel, while in other embodiments the color saturation can be increased or decreased a predetermined degree as needed. After being adjusted by the global saturation unit 404, the pixels change from the color distribution diagram F101 to another color distribution diagram F110. In such a way, the color saturation factors of the pixels of the whole image frame can be adjusted in general, while remaining the color hue and luminance factors unchanged, so as to drastically reduce the complexity of calculation.

The global intensity unit 405 is adapted for adjust luminance intensities of the pixels of the whole image frame in general. FIG. 5-4 is a schematic diagram illustrating a global intensity adjustment according to the fourth embodiment of the present invention. Referring to FIG. 5-4, the fourth embodiment is illustrated in which the global intensity unit 404 adds 3 to the luminance intensity of each pixel, while in other embodiments the luminance intensities can be increased or decreased a predetermined degree as needed. Assuming luminance intensities of the pixels P1 through P9 of FIG. 2B are 1 through 9 respectively, after being adjusted by the global intensity unit 405, the pixels change from the color distribution diagram F101 to another color distribution diagram F111, in which the luminance intensity of the pixels P1 through P9 change to 4 through 12 respectively, while the color hue and color saturation factors remain unchanged. In such a way, the luminance factors of the pixels of the whole image frame can be adjusted in general, while remaining color hue and color saturation unchanged, so as to drastically reduce the complexity of calculation.

The luminance counting unit 406 is adapted for counting the number of pixels of each pixel group of the image frame, in which each pixel group has a luminance intensity in a specific predetermined range. FIG. 5-5 is a schematic diagram illustrating a luminance accounting according to the fourth embodiment of the present invention. Referring to FIG. 5-5, the embodiment is illustrated in which the luminance counting unit 406 counts number of pixels of P1 through P9 of the color distribution diagram F101. Assuming the luminance intensities of the pixels P1 through P9 are 1 through 9 respectively, after being counted, the color distribution diagram F101 changes to FIG. 5-5. As shown in FIG. 5-5, the pixel amount with luminance intensities 1 to 9 is respectively 1. In such a way, the luminance intensity distribution the pixels of the image frame can be learnt by employing the luminance counting unit 406. In other words, by using the luminance counting unit 406, the pixel frame can be concluded too dark or too bright. For example, if the frame is too bright, then it could be adjusted darker, or if the frame is too dark, then it could be adjusted brighter.

Figures 2, 3, 4, 5, 6:
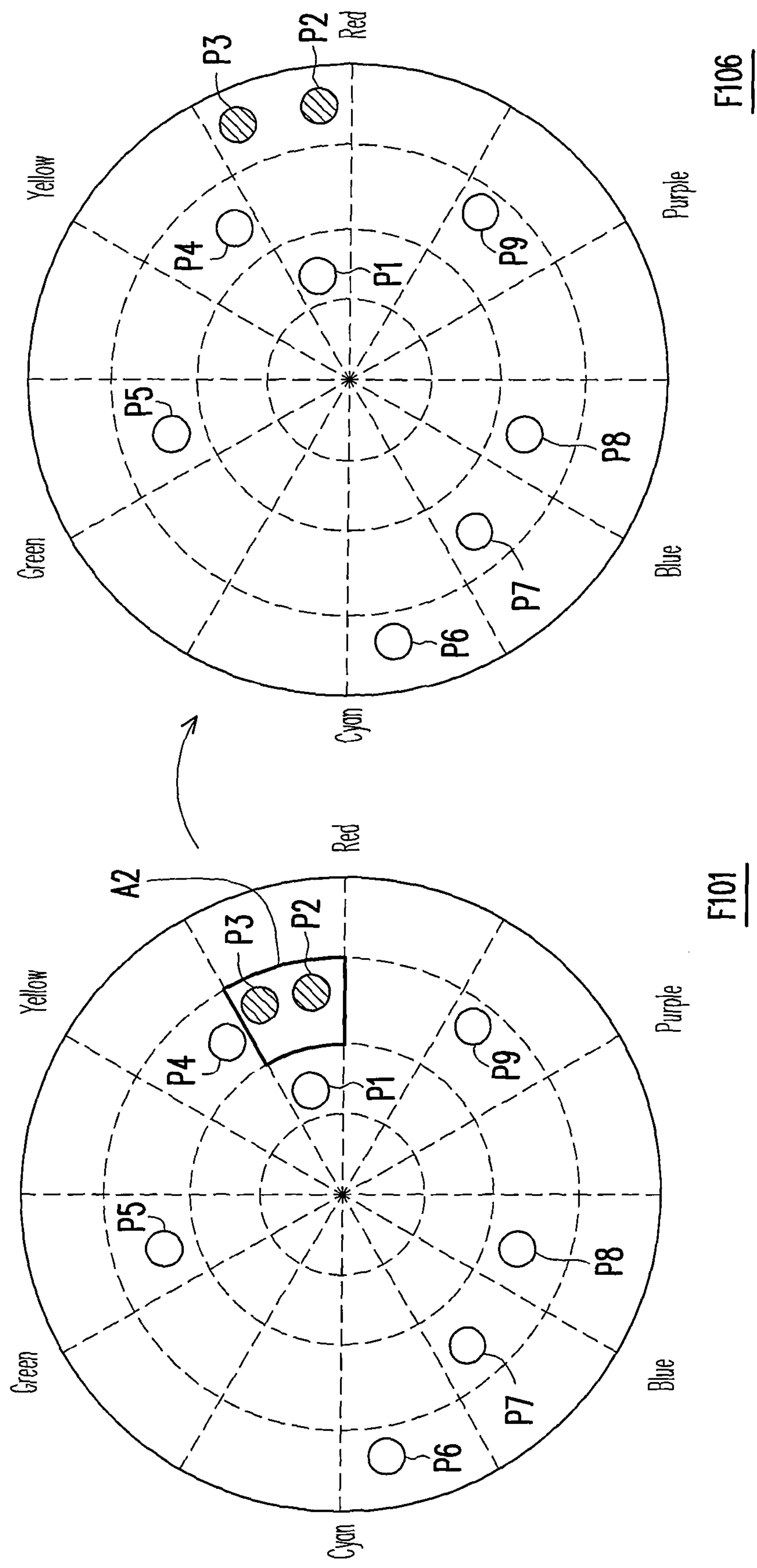

Similarly, one of ordinary skill in the art may also modify the foregoing embodiments according to the spirit of the present invention and within the scope of the present invention to adjust a contrast of the image frame according to the luminance intensity distribution of the pixels. For example, FIG. 6 is a luminance gamma curve according to the fourth embodiment of the present invention. Referring to FIG. 6, according to an aspect of the further embodiment, a luminance gamma curve unit 407 is coupled to the luminance counting unit 406. The luminance gamma curve unit 407 obtains a luminance curve according to the luminance intensity distribution of the pixels counted by the luminance counting unit 406. Those of ordinary skill in the art should understand that the luminance curve presented in FIG. 6 is given for this embodiment for illustration purpose only, while in other embodiments, other suitable luminance curves may be obtained as needed. The color engine 30, in the fourth embodiment for example adjusts the video signals according to the luminance gamma curve. After being adjusted, the luminance of each pixel is converted into a new one, so that the contrast of the image frame can be improved. In another aspect of the embodiment, more than one luminance gamma curves can be predetermined and preset, which can be later selected for adjustment by the luminance gamma curve unit 407 according to the luminance intensity distribution of the pixels counted by the luminance counting unit 406.

Figures 2, 3, 4, 5, 6, 7:
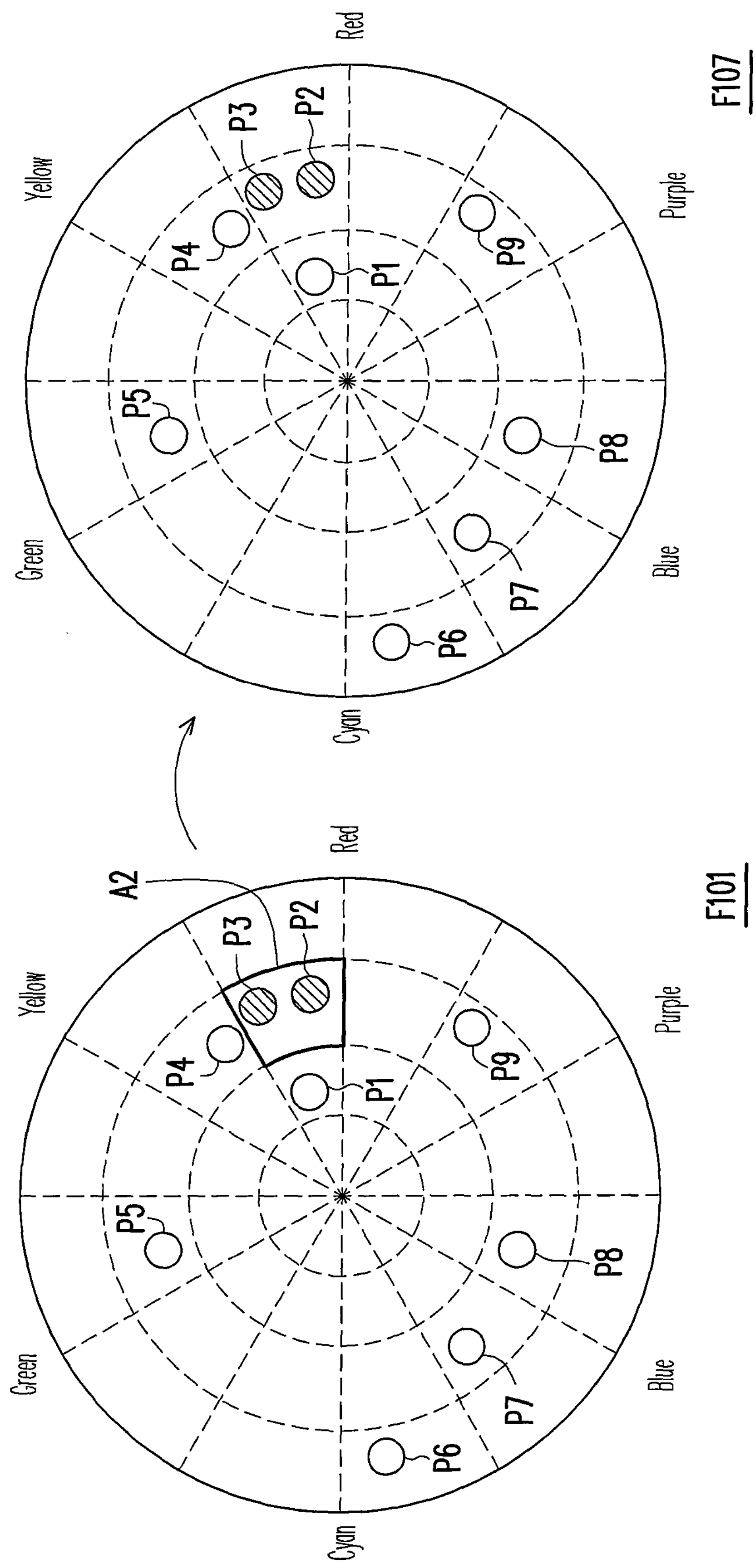
Figure 3:
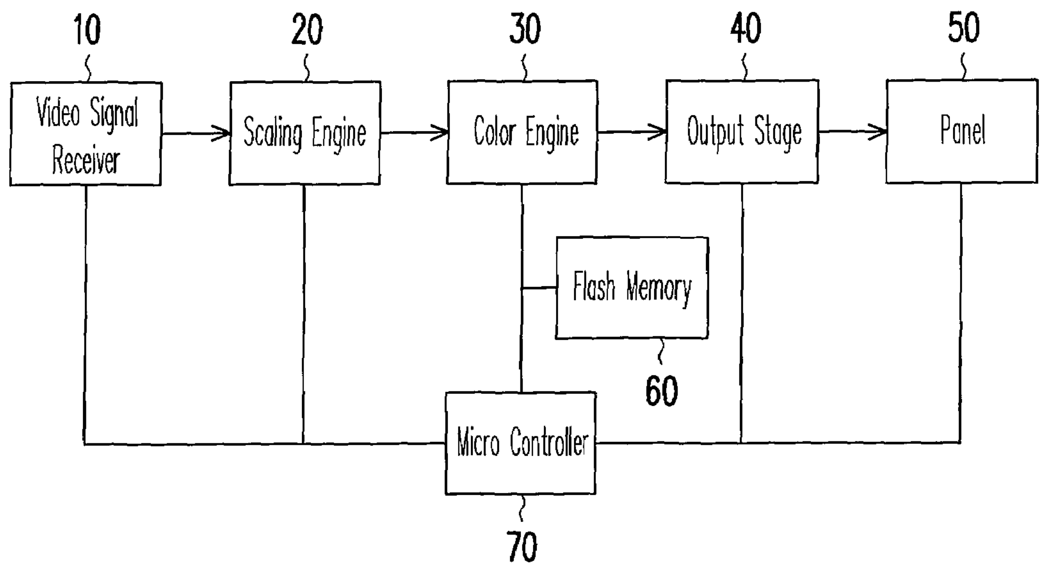
Figure 4:
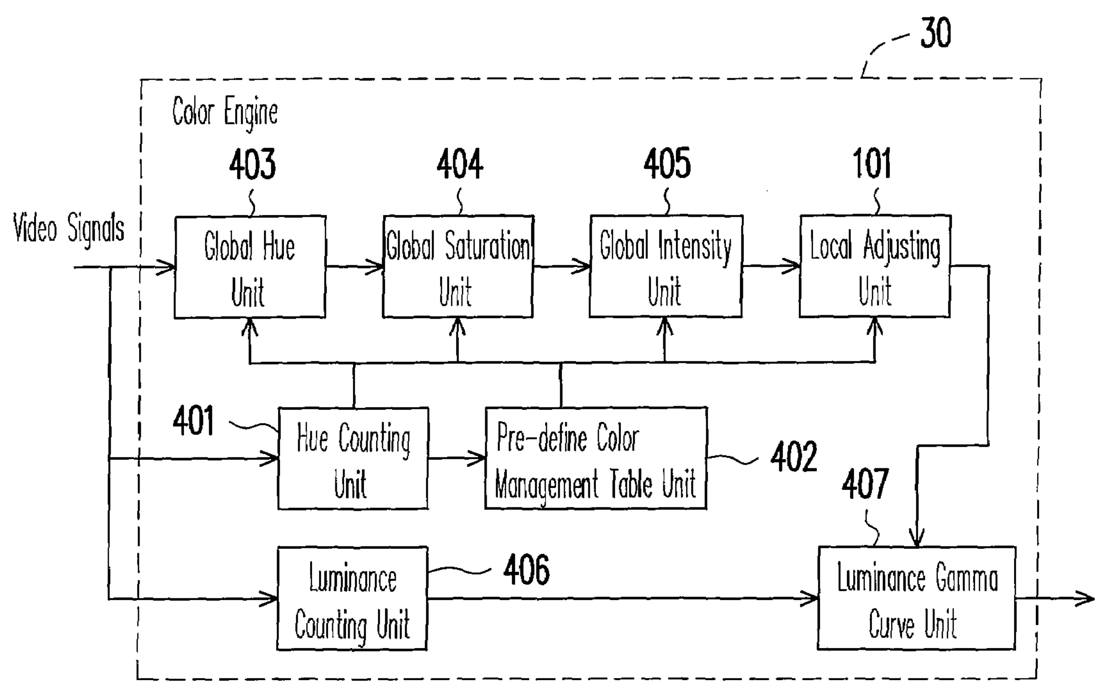
Figure 5:
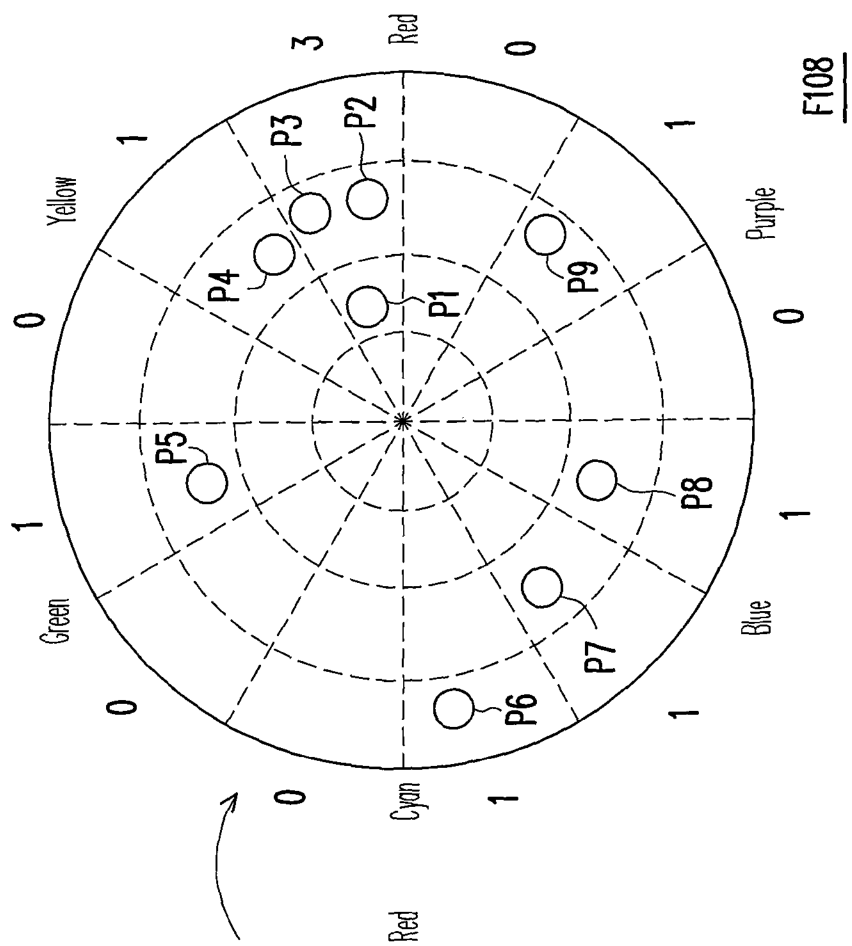
Figure 1:
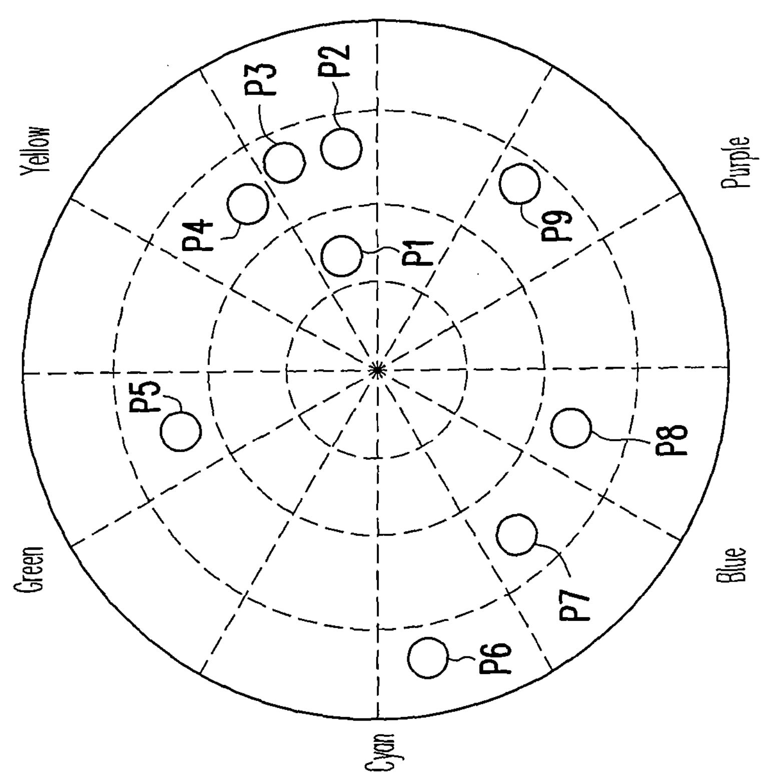
Figures 2, 5:
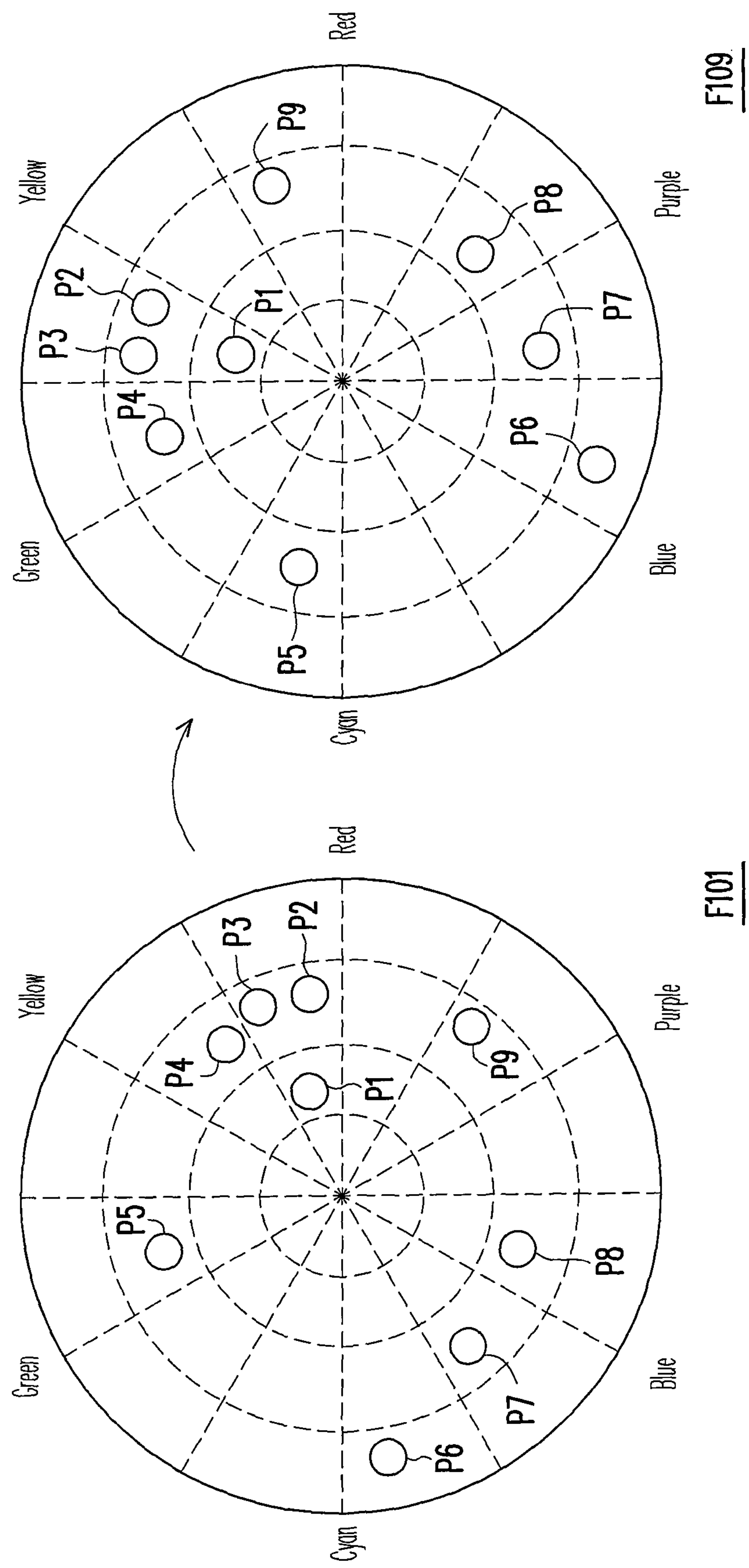
Figures 3, 5:
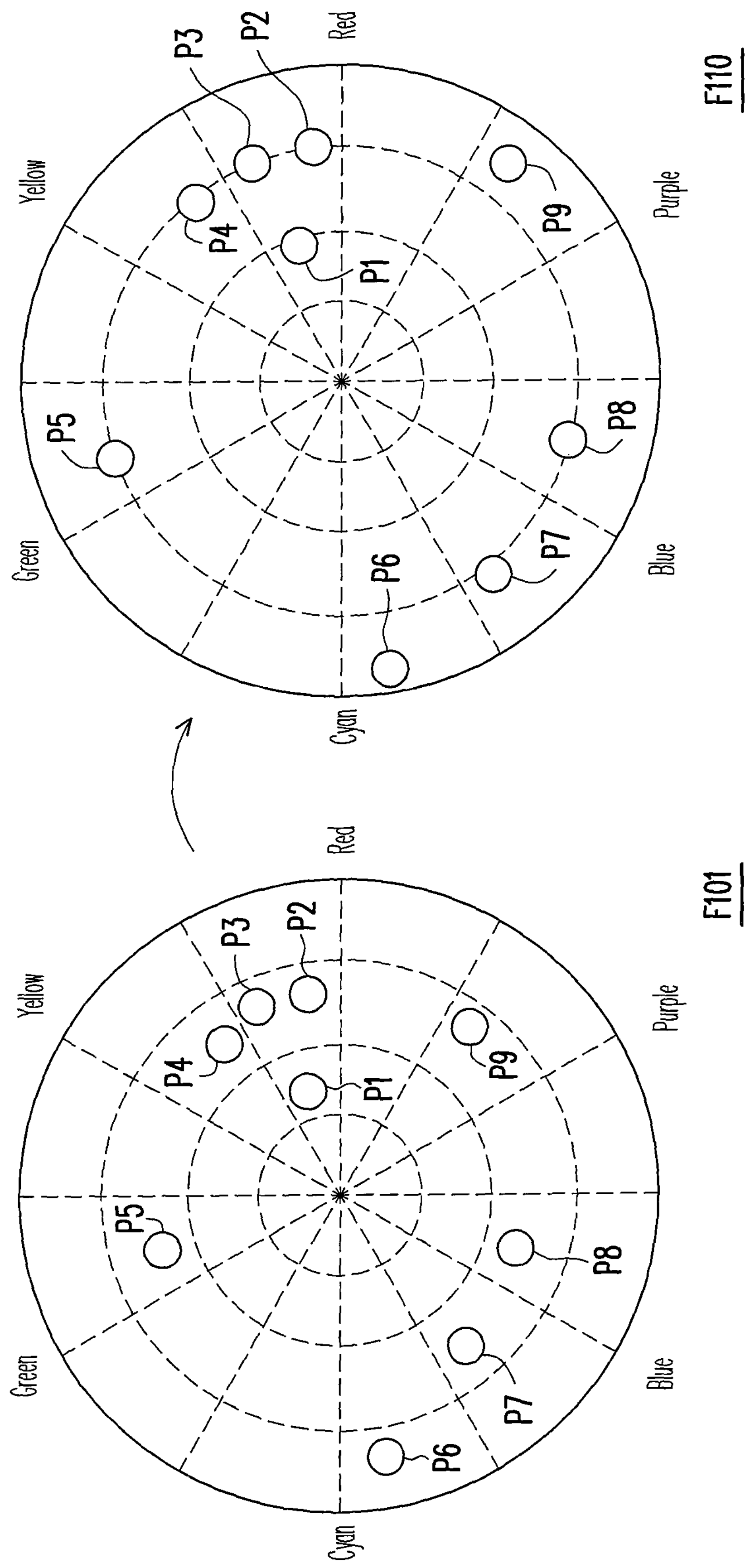
Figure 5:
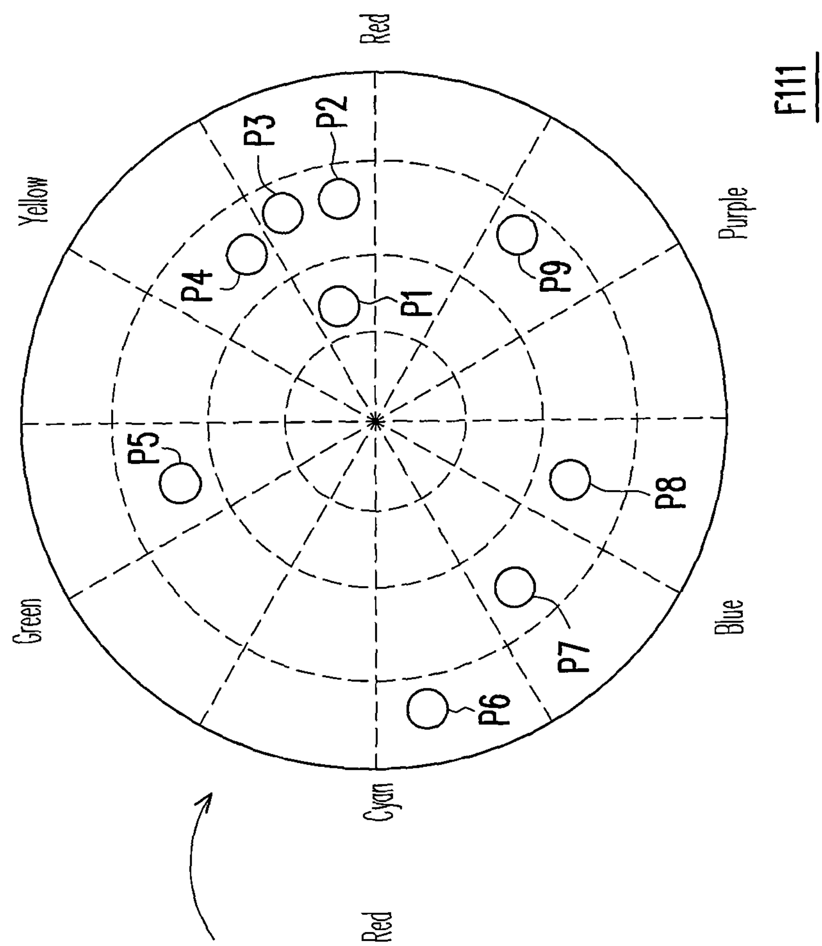
Figure 4:
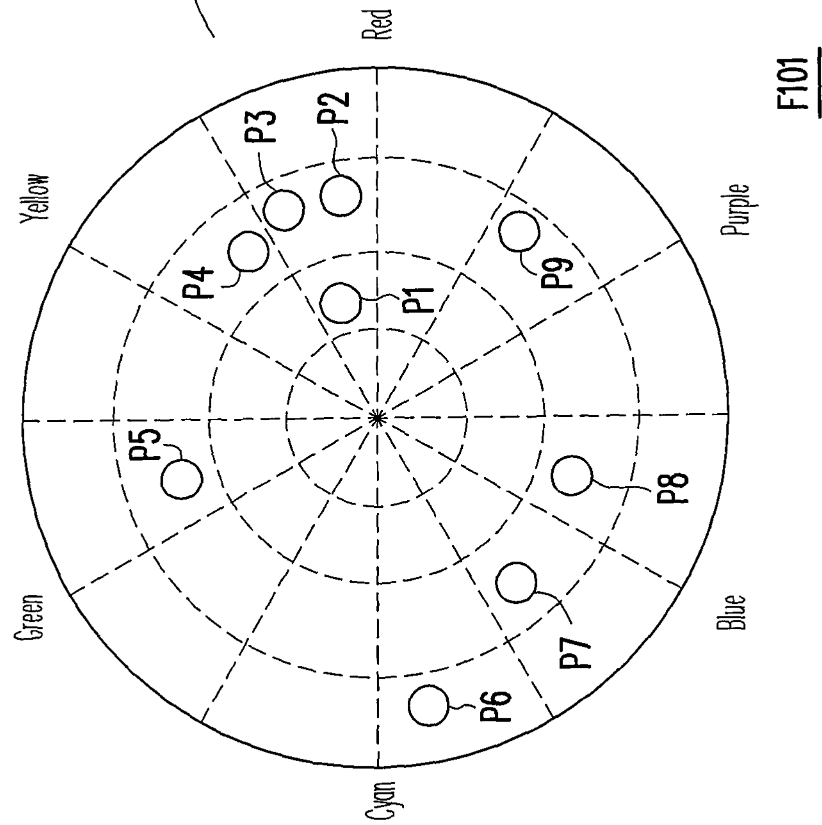
Figure 5:
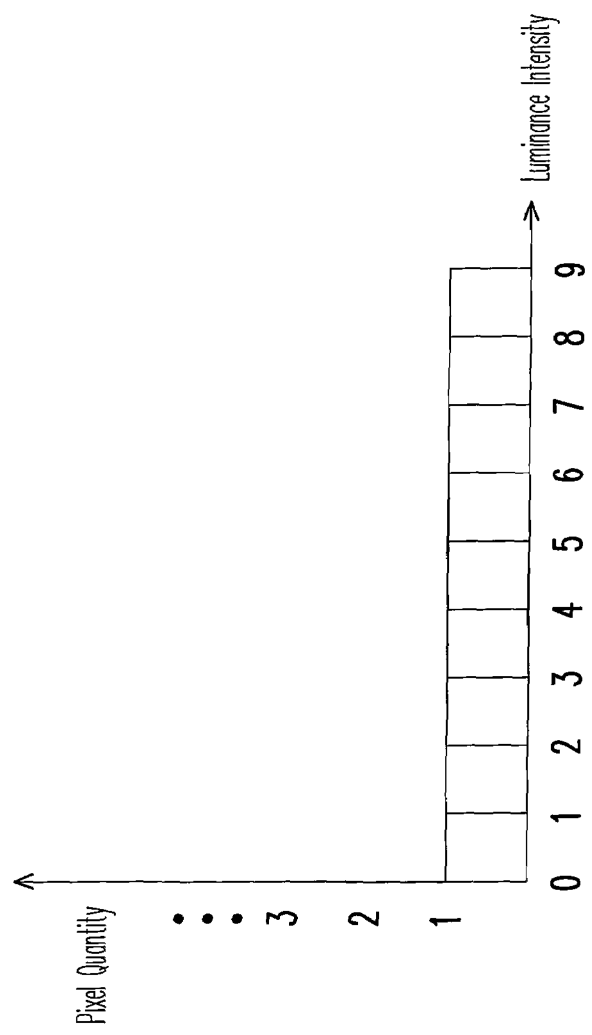
Figure 6:
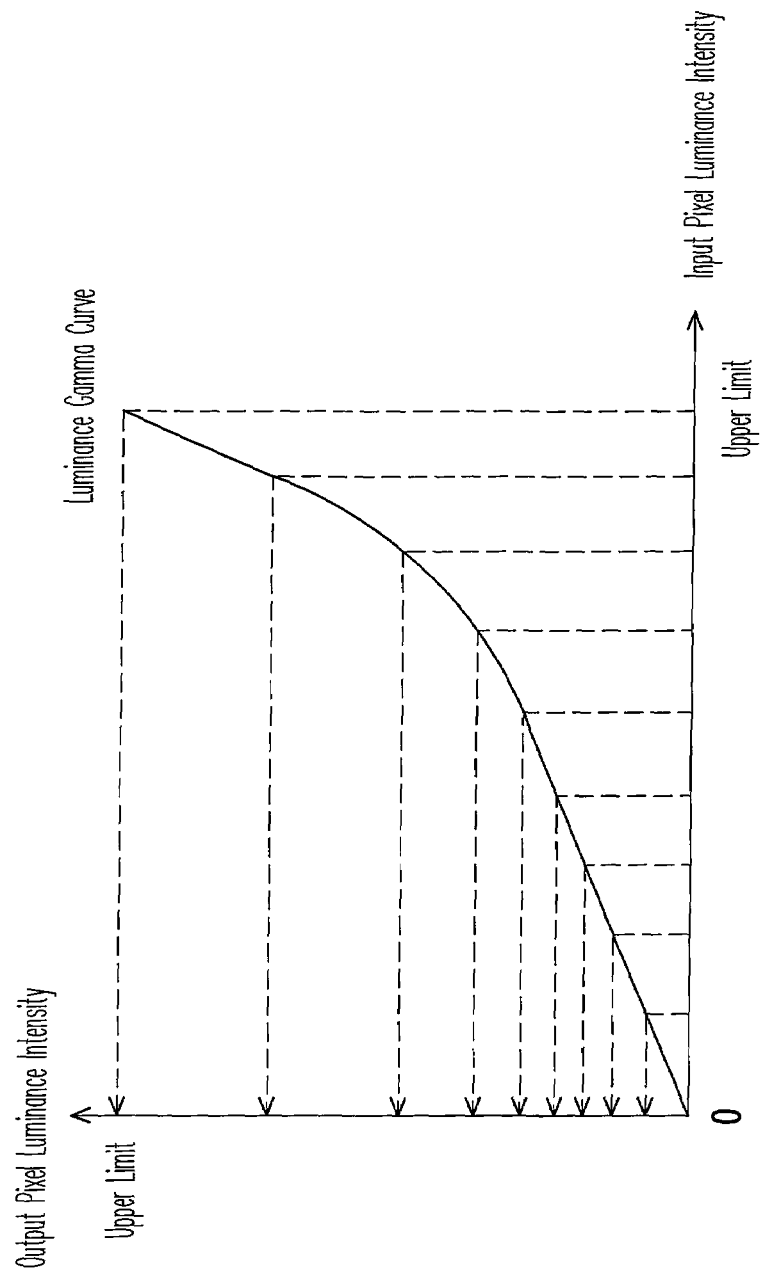
Figure 7:
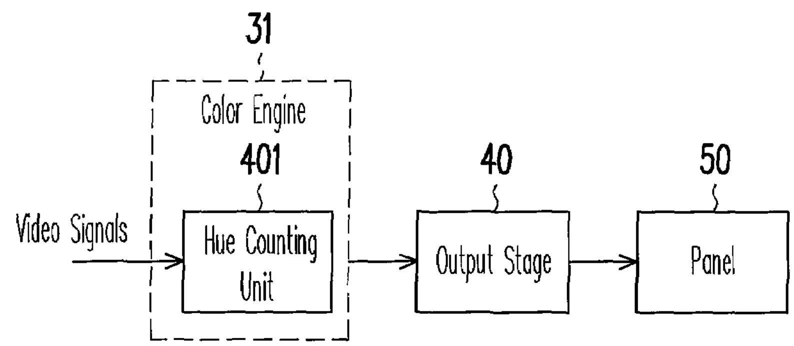

One of ordinary skill in the art may also modify the structure of the display device as taught by the foregoing embodiments according to the spirit of the present invention. For example, FIG. 7 shows a structural diagram of a display device according to the fifth embodiment of the present invention. Referring to FIG. 7, the display device includes a color engine 31, an output stage 40 and a panel 50. The color engine 31 is adapted for receiving video signals. The color engine 31 includes a hue counting unit 401 which is adapted for counting the number of pixels of each pixel group of an image frame of the video signals, each pixel group has a color hue in a specific predetermined range. The color engine adjusts the video signals according to the quantity of pixels of each pixel group. The output stage 40 is coupled to the color engine 31 for outputting the video signals. The panel 50 is coupled to the output stage 40 for displaying the adjusted video signals. The hue counting unit 401, the output stage 40 and the panel 50 can be functionally learnt by referring to the foregoing embodiments, and the description thereof will not be repeated.

Figure 8:
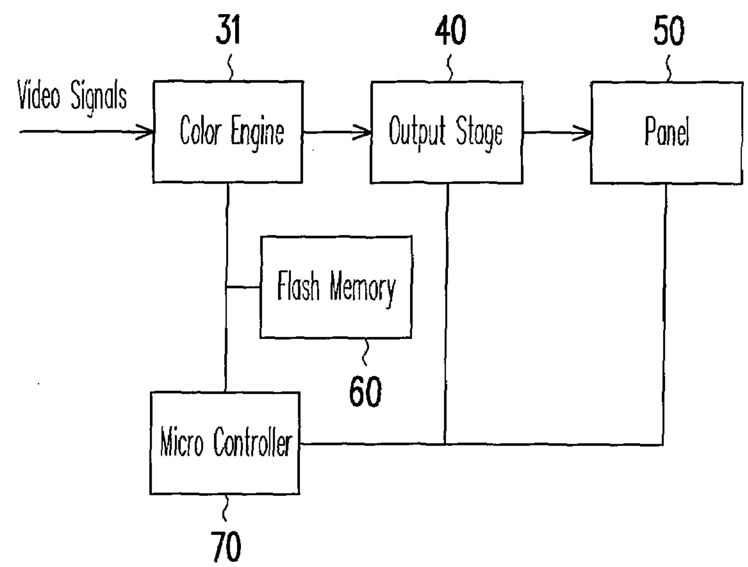
FIG. 8 is a structural diagram illustrating a display device according to the sixth embodiment of the present invention.

One of ordinary skill in the art may also modify the structure of the display device as taught by the foregoing embodiments according to the spirit of the present invention. For example, FIG. 8 shows a structural diagram of a display device according to the sixth embodiment of the present invention. Referring to FIG. 8, the display device includes a color engine, an output stage 40, a panel 50, a flash memory 60, and a micro controller (MCU) 70. Functions of the color engine 31, the output stage 40, the panel 50, the flash memory 60, and the MCU 70 can be learnt by referring to the foregoing embodiments, and the description thereof will not be repeated.

Figure 9:
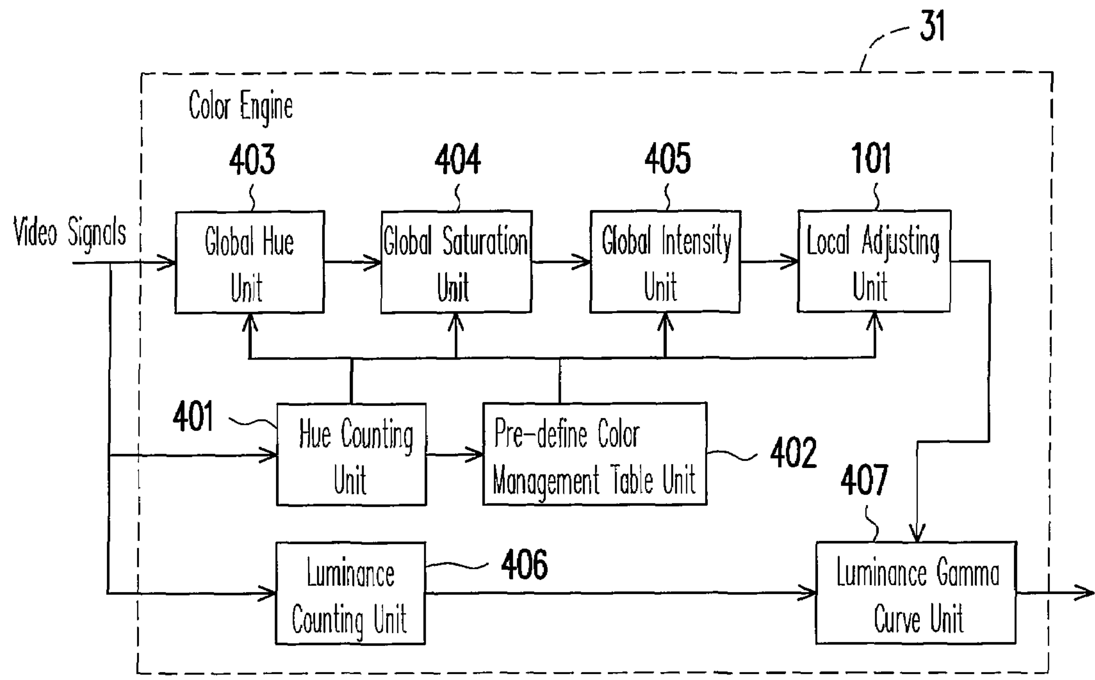
FIG. 9 is a structural diagram illustrating a color engine according to the seventh embodiment of the present invention.

One of ordinary skill in the art may also modify the structure of the display device as taught by the foregoing embodiments employing a local adjusting unit, a pre-define color management table unit, a global hue unit, a global saturation unit, a global intensity unit, a luminance counting unit, or a luminance gamma curve unit according to the spirit of the present invention, in which coupling relationship therebetween could also be adjusted. For example, FIG. 9 shows a structural diagram illustrating a color engine according to the seventh embodiment of the present invention. Referring to FIG. 9, the color engine 31 includes a local adjusting unit 101, a hue counting unit 401, a pre-define color management table unit 402, a global hue unit 403, a global saturation unit 404, a global intensity unit 405, a luminance counting unit, a luminance gamma curve unit 407. The local adjusting unit 101, the hue counting unit 401, the pre-define color management table unit 402, the global hue unit 403, the global saturation unit 404, the global intensity unit 405, the luminance counting unit, and the luminance gamma curve unit 407 can be learnt by referring to the foregoing embodiments and the description thereof will not be repeated.

Figures 1, 10:
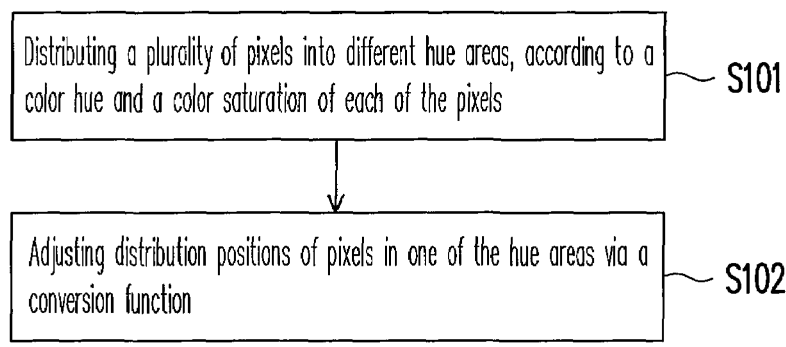
Figures 2, 10:
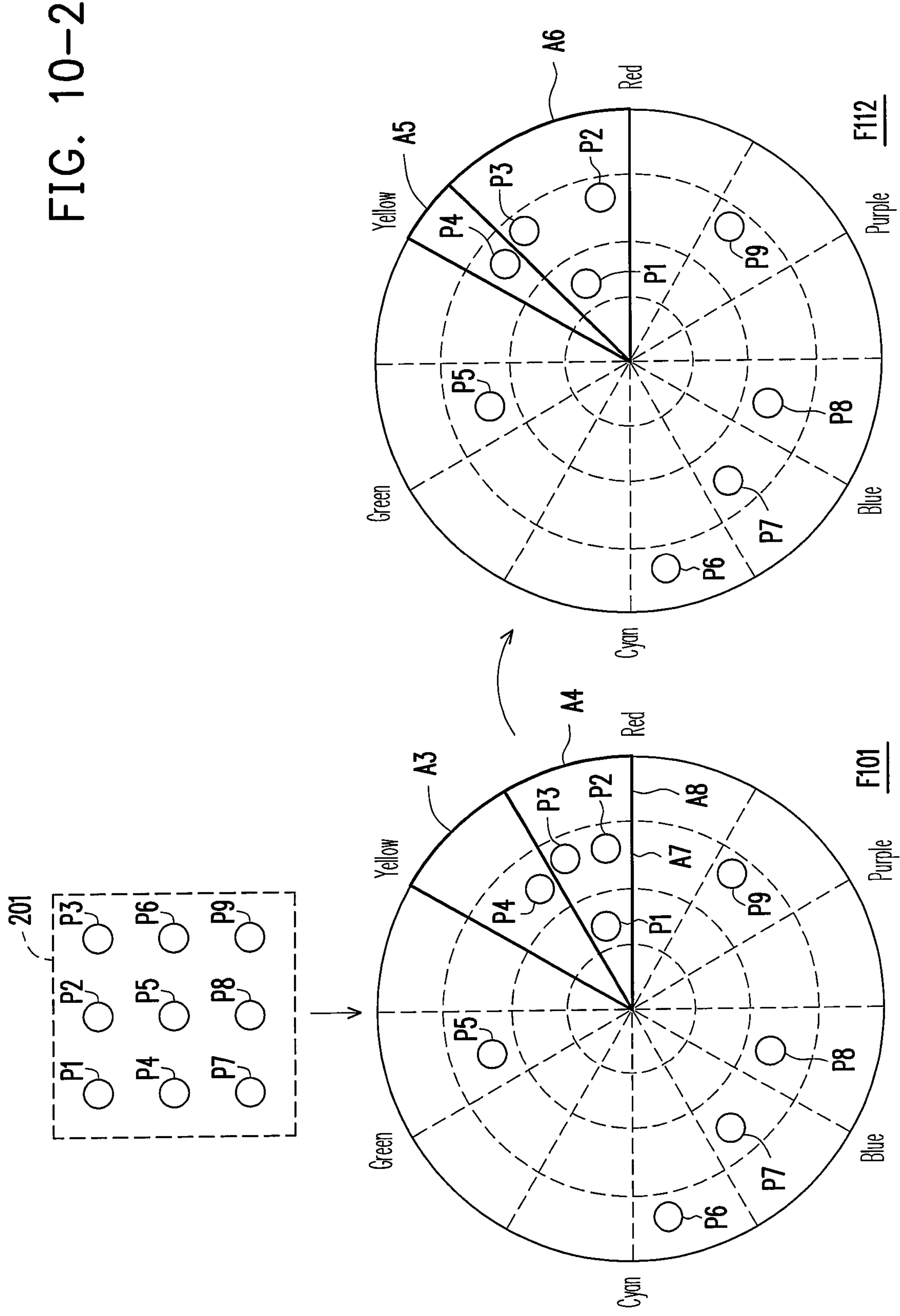
Figures 3, 10:
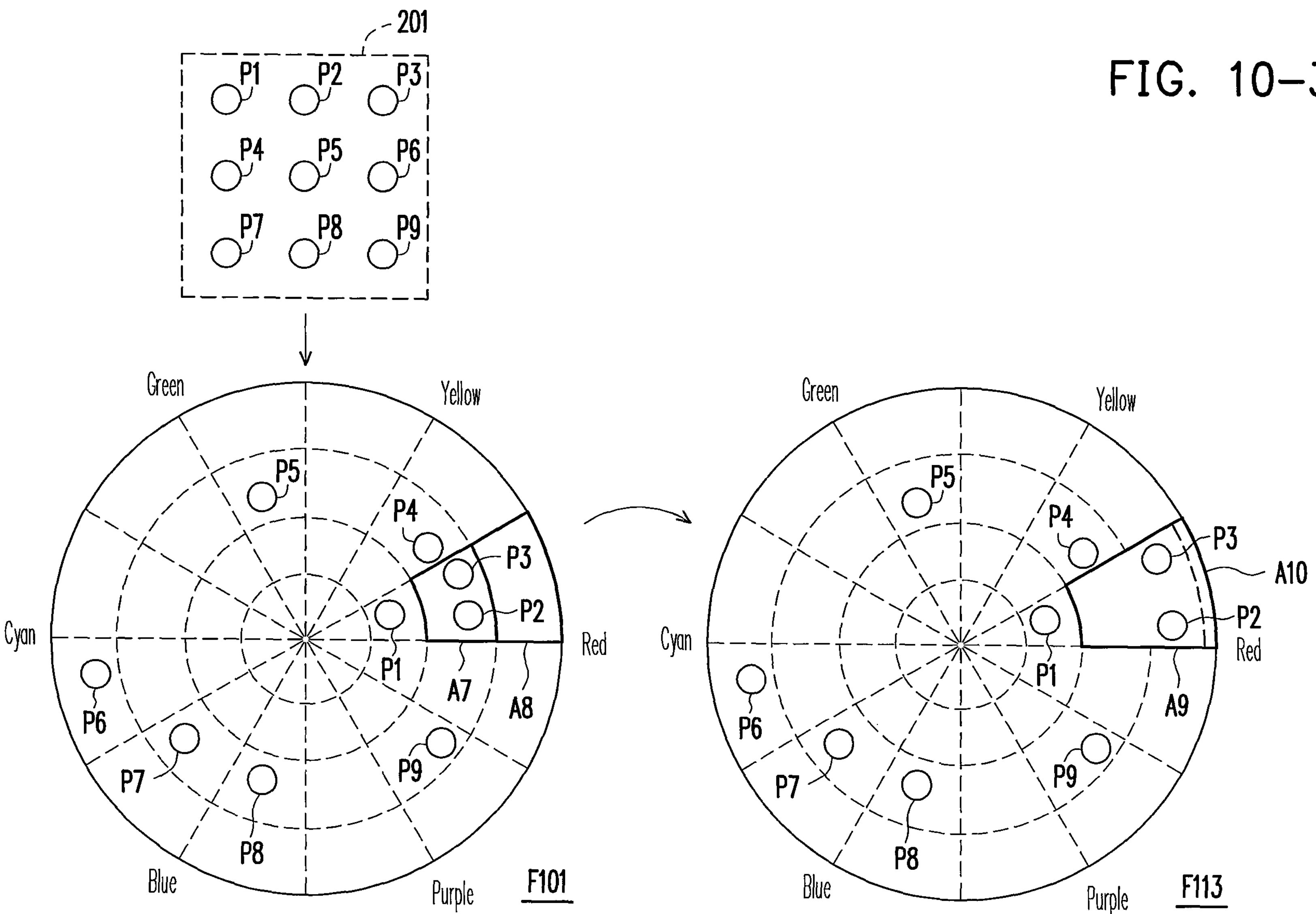

FIG. 10-1 is a flow chart illustrating a color adjustment method for the display device of the eighth embodiment of the present invention. Referring to FIG. 10-1, step S101 is executed first, in which the color engine of the foregoing embodiments distributes a plurality of pixels into a plurality of corresponding color hue areas, according to the color hue and color saturation factors of the pixels. Next, step S102 is executed, in which the color engine adjusts distributed positions of pixels in one of the color hue areas according to a conversion function.

FIG. 10-2 is a schematic diagram illustrating a color adjustment according to FIG. 10-1. Referring to FIG. 10-2, an image frame 201 includes pixels P1 through P9. The image frame 201 shifts to the color distribution diagram F101 after the step S101. Next, the color distribution diagram F101 shifts to another color distribution diagram F112 after the step S102. It should be noted that areas A3 and A4 of the color distribution diagram F101 have been converted into areas A5 and A6 of the color distribution diagram F112 by the conversion function. In this manner, the pixels P1 through P4 are shifted to different positions according to the changes of areas. In other words, color hues of the pixels P1 through P4 are changed by the conversion function. In such a way, the conversion function is adapted for conversion of positions of pixels in different areas so as to smoothly adjust color hues of pixels, thus avoiding color discontinuation of the pixels. One having ordinary skill in the art may also modify the present invention to adjust the color hue factors of the pixels by using an interpolation method. Such approach is well known and is not to described herein.

FIG. 10-3 is a schematic diagram illustrating another color adjustment according to FIG. 10-1. Referring to FIG. 10-3, an image frame 201 includes pixels P1 through P9. The image frame 201 shifts to the color distribution diagram F101 after the step S101. Next, the color distribution diagram F101 shifts to another color distribution diagram F113 after the step S102. It should be noted that areas A7 and A8 of the color distribution diagram F101 have been converted into areas A9 and A10 of the color distribution diagram F113 by the conversion function. In this manner, the pixels P2 and P3 are shifted to different positions according to the changes of areas. In other words, color saturation of the pixels P2 and P3 are changed by the conversion function. In such a way, the conversion function is adapted for conversion of positions of pixels in different areas so as to smoothly adjust color hues of pixels, thus avoiding color discontinuation of the pixels. One having ordinary skill in the art may also modify the present invention to adjust the color hue factors of the pixels by using an interpolation method. Such approach is well known and is not to described herein.

One having ordinary skill in the art may also modify the above embodiments to simultaneously adjust sizes, shapes and positions of the distributed areas according to the conversion function, namely simultaneously adjusting color hue and color saturation factors.

One having ordinary skill in the art may also modify the above embodiments. For example a pixel quantity of each color area can be counted by the color hue counting unit, and therefore the color engine generates a conversion function according to the counted quantity. Then, the color engine can adjust the color of the video signals according to the conversion function. Further, a pixel quantity of pixels having a luminance intensity in a specific predetermined range can be counted by the intensity counting unit. The luminance gamma curve unit then can generate a luminance gamma curve according to the counted pixel quantity, and thus adjusting the luminance intensity of the video signals according to the luminance gamma curve.

Accordingly, the present invention has at least the following advantages.

1. By employing a local adjusting unit, color hue, color saturation, or luminance factors of a first pixel group having a color hue in a specific predetermined range in the image frame of the video signals can be adjusted, while remaining the color hue, color saturation, and luminance factors of other pixels unchanged;

2. By employing a local adjusting unit, color hue, color saturation, or luminance factors of a second pixel group having a color hue in a specific predetermined range, and a color saturation in a specific predetermined range in the image frame of the video signals can be adjusted, while remaining the color hue, color saturation, and luminance factors of other pixels unchanged;

3. The hue counting unit is adapted for counting a pixel number of a plurality of pixel groups, each of which has a color hue in a specific predetermined range, so as to adjust the video signals.

4. The conversion function is adapted for adjusting sizes and positions of different areas, by which color hue, color saturation factors of the pixels can be smoothly adjusted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device, comprising:

a video signal receiver, for receiving video signals;

a scaling engine, coupled to the video signal receiver, for modulating a resolution of an image frame of the video signals;

a color engine, coupled to the scaling engine, comprising a local adjusting unit, for dividing pixels of the image frame of the video signals into multiple pixel groups according to color hue of the pixels in a HSI color space, in which H represents hue; S represents saturation; and I represents intensity, and adjusting color hue of a specific pixel group of the pixel groups having color hue in a predetermined range that is a part of a full range of color hue by moving the pixels of the specific pixel group from a region to another region of the HSI color space without changing color axes of the HSI color space, so as to locally adjust the color hue of the pixels of the specific pixel group under the HSI color space without moving any other pixel groups other than the specific pixel group of the whole image frame under the HSI color space;

an output stage, coupled to the color engine, for outputting the adjusted video signals; and a panel, coupled to the output stage, for displaying the adjusted video signals.

2. The display device according to claim 1, wherein the specific pixel group being adjusted is further confined for the pixels within a predetermined range of color saturation that is a part of full range of color saturation.

3. The display device according to claim 1 further comprising:

a micro controller, for calculating and controlling the display device; and a flash memory, coupled to the color engine, having a color adjustment program code.

4. The display device according to claim 1, wherein the color engine further comprises:

a hue counting unit, for counting number of pixels in each pixel group of the image frame of the video signals to provide to the color engine to adjust the video signals according to the counting number of pixels in each pixel group under the HSI space.

5. The display device according to claim 4, wherein the color engine further comprises:

a pre-define color management table unit, for determining a color management table according to the number of pixels in the pixel groups, wherein the color engine for adjusting the image of the video signals according to the color management table.

6. The display device according to claim 1, wherein the color engine further comprises:

a global hue unit, for adjusting color hue of the image frame;

a global saturation unit, for adjusting color saturation of the image frame; and a global intensity unit, for adjusting luminance intensity of the image frame.

7. The display device according to claim 1, wherein the color engine further comprises:

a luminance counting unit, for counting number of pixels in each pixel group of the image frame, wherein each pixel group has luminance intensity in a predetermined range that is a part of a full range of luminance intensity; and a luminance gamma curve unit, coupled to the luminance counting unit, for obtaining a luminance curve according to the number of pixels counted by the luminance counting unit, wherein the color engine for adjusting the image of the video signals according to the luminance curve.

8. A display device, comprising:

a color engine, for receiving video signals and to adjust the video signals of pixels of an image frame in a HSI color space, in which H represents hue; S represents saturation; and I represents intensity, wherein the pixels of the image frame is divided into multiple pixel groups according to color hue of the pixels, the color engine comprising:

a hue counting unit, for counting number of pixels in each pixel group of an image frame of the video signals to provide to the color engine to adjust the video signals according to the counting number of pixels in each pixel group under the HSI space, wherein each pixel group comprises color hue in a predetermined range that is a part of a full range of color hue;

an output stage, coupled to the color engine, for outputting the adjusted video signals; and a panel, coupled to the output stage, for displaying the adjusted video signals.

9. The display device according to claim 8, wherein the color engine further comprising:

a local adjusting unit, for adjusting color hue of a specific pixel group having color hue in a predetermined range that is a part of the full range of color hue by moving the pixels of the specific pixel group from a region to another region of the HSI color space without changing color axes of the HSI color space, so as to locally adjust the color hue of the specific portion under the HSI color space without moving any other pixel groups other than the specific pixel group of the whole image frame under the HSI color space.

10. The display device in accordance with claim 9, wherein the pixels of the specific pixel group are also divided into multiple color saturation groups according to color saturation, wherein each color saturation group is in a predetermined range that is a part of the full range of color saturation, and the local adjusting unit is adapted for adjusting color hue of a specific one of the color saturation groups.

11. The display device according to claim 8 further comprising:

a micro controller, for calculating and controlling the display device; and a flash memory, coupled to the color engine, comprising a color adjustment program code.

12. The display device according to claim 8, wherein the color engine comprises:

a pre-defined color management table unit, for determining a color management table according to the number of pixels in the pixel groups, wherein the color engine for adjusting the image of the video signals according to the color management table.

13. The display device according to claim 8, wherein the color engine comprises:

a global hue unit, for adjusting color hue of the image frame;

a global saturation unit, for adjusting color saturation of the image frame; and a global intensity unit, for adjusting luminance intensity of the image frame.

14. The display device in according to claim 8, wherein the color engine further comprises:

a luminance counting unit, for counting number of pixels in each pixel group of the image frame, wherein each pixel group comprises luminance intensity in a predetermined range that is a part of a full range of luminance intensity; and a luminance gamma curve unit, coupled to the luminance counting unit, for obtaining a luminance curve according to the number of the pixels counted by the luminance counting unit, wherein the color engine for adjusting the image of the video signals according to the luminance curve.

15. A method for displaying video signals, comprising:

receiving video signals, that are digital signals;

modulating a resolution of the video signals;

dividing pixels of an image frame of the video signals into multiple pixel groups according to color hue of the pixels in a HSI color space, in which H represents hue; S represents saturation; and I represents intensity;

adjusting color hue of a specific pixel group of the pixel groups without changing axes in the HSI color space, wherein the specific pixel group has color hue in a predetermined range that is a part of a full range of color hue, so as to locally adjust the pixels of the specific pixel group without moving the pixels of the pixel groups other than the specific pixel group; and displaying the adjusted video signals.

16. The method according to claim 15, wherein the specific pixel group being adjusted is further confined for the pixels within a predetermined range of color saturation that is a part of full range of color saturation.

17. The method according to claim 15, further comprising counting number of pixels in pixel groups of the image frame and adjusting the video signals according to the counting number of pixels in each pixel group under the HSI space.

18. The method according to claim 17 further comprising determining a color management table according to the number of pixels in the pixel groups; and adjusting the video signals according to the color management table.

19. The method in accordance with claim 15, further comprising:

adjusting color hue of the image frame;

adjusting color saturation of the image frame; and adjusting luminance of the image frame.

20. The method in accordance with claim 15, further comprising:

counting number of pixels in the pixel groups, each having luminance intensity in a predetermined range that is a part of a full range of luminance intensity;

determining a luminance gamma curve according to the counted pixel number of the pixel groups; and adjusting the video signals according to the luminance gamma curve.

21. A method for displaying video signals, comprising:

receiving video signals, that are digital signals;

dividing pixels of an image frame of the video signals into multiple pixel groups;

counting number of pixels in each of the pixel groups, each pixel group having color hue in a predetermined range that is a part of a full range of color hue in a HSI color space, in which H represents hue; S represents saturation; and I represents intensity;

adjusting the video signals according to the counted number of pixels of each of the pixel groups under the HSI space; and displaying the adjusted video signals.

22. The method according to claim 21, wherein further comprising adjusting color hue of a specific pixel group having color hue in a predetermined range that is the first part of the full range of color hue by moving the pixels of the specific pixel group from a region to another region of the HSI color space without changing color axes of the HSI color space, so as to locally adjust a first specific portion of whole pixels without moving any other pixel groups other than the specific pixel group of the whole image frame under the HSI color space.

23. The method according to claim 22, wherein the specific pixel group being adjusted is further confined for the pixels within a predetermined range of color saturation that is a part of full range of color saturation.

24. The method according to claim 21 further comprising;

determining a color management table according to the number of pixels in the pixel groups; and adjusting the video signals according to the color management table.

25. The method according to claim 21, further comprising:

adjusting color hue of the image frame;

adjusting color saturation of the image frame; and adjusting luminance of the image frame.

26. The method according to claim 21, further comprising:

counting number of pixels in the pixel groups, each of which having luminance intensity in a predetermined range that is a part of a full range of luminance intensity;

determining a luminance gamma curve according to the counted number of pixels in the pixel groups; and adjusting the digital video signals according to the luminance gamma curve.

27. A color adjustment method used in a display device to adjust video signals, comprising:

distributing a plurality of pixels of video signals of an image frame into different hue areas in a HSI color space in which H represents hue; S represents saturation; and I represents intensity, wherein each of the hue areas is a part of a whole hue area; and adjusting distribution positions of hue of the pixels in one of the hue areas via a conversion function so as to obtain adjusted video signals by moving the pixels of the hue area from a region to another region of the HSI color space without changing color axes of the HSI color space, wherein the hue areas are individually adjusted without moving any other one of the hue areas under the HSI color space.

28. The color adjustment method according to claim 27, further comprising:

counting number of pixels in each of the hue areas; and generating the conversion function according to the counted number of pixels.

29. The color adjustment method according to claim 27, further comprising:

adjusting luminance intensities of pixels in each of the hue areas.

30. The color adjustment method according to claim 27, further comprising:

adjusting pixels in each of the hue areas according to a luminance gamma curve.

31. The color adjustment method according to claim 27, further comprising:

adjusting distribution positions of pixels in each of the hue areas via a conversion function.

32. The color adjustment method according to claim 27, further comprising:

adjusting color hue of pixels in each of the hue areas.

33. The color adjustment method according to claim 27, further comprising:

adjusting color saturation of pixels in each of the hue areas.

* * * * *